(12) United States Patent
Shepard et al.

(10) Patent No.: US 12,477,205 B1
(45) Date of Patent: Nov. 18, 2025

(54) FOVEATED IMAGER FOR AUTOMOTIVE APPLICATIONS

(71) Applicant: Waymo LLC, Mountain View, CA (US)

(72) Inventors: Ralph Hamilton Shepard, Menlo Park, CA (US); Joseph Patrick Warga, San Francisco, CA (US); Lucian Ion, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 93 days.

(21) Appl. No.: 18/462,248

(22) Filed: Sep. 6, 2023

(51) Int. Cl.
*H04N 23/55* (2023.01)
(52) U.S. Cl.
CPC .................... *H04N 23/55* (2023.01)
(58) Field of Classification Search
CPC ........................................ H04N 23/55
See application file for complete search history.

(56) References Cited

U.S. PATENT DOCUMENTS

| | | | |
|---|---|---|---|
| 6,867,933 | B2 | 3/2005 | Matsusaka |
| 8,581,982 | B1 | 11/2013 | Haley et al. |
| 9,030,583 | B2 | 5/2015 | Gove et al. |
| 10,180,562 | B1 | 1/2019 | Ning |
| 10,591,605 | B2 | 3/2020 | Smits |
| 10,901,177 | B2 | 1/2021 | Ning |
| 11,501,495 | B2 | 11/2022 | Banerjee et al. |
| 2008/0158226 | A1* | 7/2008 | Shimizu .............. G02B 13/06 348/308 |

(Continued)

FOREIGN PATENT DOCUMENTS

| | | | |
|---|---|---|---|
| CN | 209895077 U | * | 1/2020 |
| JP | 2005069757 A | | 3/2005 |

(Continued)

OTHER PUBLICATIONS

Shimizu, Sota, Rei Murakami, Motonori Tominaga, Yusuke Akamine, Naoki Kawasaki, Osamu Shimomura, Kazuhisa Ishimaru, and Seiichi Mita. "Development of Wide Angle Fovea Lens for High-Definition Imager Over 3 Mega Pixels." In , 2018 IEEE/RSJ International Conference on Intelligent Robots and Systems (IROS), pp. 4232.*

(Continued)

*Primary Examiner* — Girumsew Wendmagegn
(74) *Attorney, Agent, or Firm* — McDonnell Boehnen Hulbert & Berghoff LLP

(57) ABSTRACT

Example embodiments relate to foveated imagers for automotive applications. An example embodiment includes a device. The device includes a rotationally symmetric foveated lens. The rotationally symmetric foveated lens is configured to receive light from an environment. The rotationally symmetric foveated lens is also configured to produce an image at an image plane based on the received light. The device also includes an image sensor having an associated image sensor resolution. The image sensor is positioned at the image plane and configured to capture an image having an associated field of view of the environment. Based on a distortion profile of the rotationally symmetric foveated lens and the image sensor resolution, the captured image exhibits a first angular optical resolution in a central region of the field of view and a second angular optical resolution in a peripheral region of the field of view.

20 Claims, 22 Drawing Sheets

(56) References Cited

U.S. PATENT DOCUMENTS

| | | |
|---|---|---|
| 2018/0284234 A1 | 10/2018 | Curatu |
| 2020/0342623 A1 | 10/2020 | Cull et al. |
| 2021/0319533 A1 | 10/2021 | Choi et al. |
| 2022/0174254 A1 | 6/2022 | Lewin |
| 2022/0236541 A1 | 7/2022 | Kurokawa et al. |
| 2022/0301099 A1 | 9/2022 | Cebron et al. |

FOREIGN PATENT DOCUMENTS

| | | | |
|---|---|---|---|
| JP | 2019197231 | A | 11/2019 |
| JP | 2023016888 | A | 2/2023 |
| JP | 2023109164 | A | 8/2023 |
| KR | 10-196481 | B1 | 6/1999 |
| KR | 101964181 | B1 | 4/2019 |
| WO | 2013152205 | A1 | 10/2013 |
| WO | 2022138208 | A1 | 6/2022 |

OTHER PUBLICATIONS

Akşit, Kaan, Praneeth Chakravarthula, Kishore Rathinavel, Youngmo Jeong, Rachel Albert, Henry Fuchs, and David Luebke. "Manufacturing application-driven foveated near-eye displays." IEEE transactions on visualization and computer graphics 25, No. 5 (2019): 1928-1939.

Koifman, Vladimir and Ingle, Atul. "Samsing-Corephotonics Unveils Foveated Automotive Camera", Image Sensors World, published Jan. 20, 2020, downloaded May 1, 2023, 1 page.

Thavamani, Chittesh, Mengtian Li, Nicolas Cebron, and Deva Ramanan. "Fovea: Foveated image magnification for autonomous navigation." In Proceedings of the IEEE/CVF international conference on computer vision, pp. 15539-15548. 2021.

Hagen, Nathan, and Tomasz S. Tkaczyk. "Foveated endoscopic lens." Journal of biomedical optics 17, No. 2 (2012): 021104-021104.

Shimizu, Sota, Rei Murakami, Motonori Tominaga, Yusuke Akamine, Naoki Kawasaki, Osamu Shimomura, Kazuhisa Ishimaru, and Seiichi Mita. "Development of Wide Angle Fovea Lens for High-Definition Imager Over 3 Mega Pixels." In 2018 IEEE/RSJ International Conference on Intelligent Robots and Systems (IROS), pp. 4232-4237. IEEE, 2018.

Suematu, Yoshikazu, and Hironaro Yamada. "A wide angle vision sensor with fovea-design of distortion lens and the simulated images." In Proceedings of IECON'93-19th Annual Conference of IEEE Industrial Electronics, pp. 1770-1773. IEEE, 1993.

\* cited by examiner

FOVEATED IMAGER FOR AUTOMOTIVE APPLICATIONS

BACKGROUND

Unless otherwise indicated herein, the description in this section is not prior art to the claims in this application and is not admitted to be prior art by inclusion in this section.

Cameras are devices used to capture images of an environment. Some cameras (e.g., film cameras) chemically capture an image on film. Other cameras (e.g., digital cameras) electrically capture image data (e.g., using image sensors such as charge-coupled devices (CCDs) or complementary metal-oxide-semiconductor (CMOS) sensors). Images captured by cameras can be analyzed to determine their contents. For example, the field of computer vision involves a series of technologies used to capture data of surroundings and use the data to determine information about the surroundings. Further, computer vision may be used to perform object detection, identification, and/or avoidance. As an example, a processor may execute a machine-learning algorithm in order to identify objects in an environment based on a library of previously classified objects that includes objects' shapes, colors, sizes, etc. (e.g., such a machine-learning algorithm can be applied in computer vision in robotics or other applications). In some cases, computer vision may be employed on a vehicle operating in an autonomous mode. In such applications, a camera may capture an image and, based upon the image, the vehicle operating in an autonomous mode may make control decisions (e.g., what speed to travel at, where to turn, when to stop, and when to honk the horn).

SUMMARY

Example embodiments relate to cameras that include lenses with non-uniform distortion profiles (e.g., foveated lenses). Such lenses may allow the cameras described herein to correspondingly have non-uniform angular optical resolutions (and related optical resolvabilities) across fields of view captured by image sensors of the cameras. Such non-uniformity may allow for captured images to (i) include larger fields of view (e.g., in a horizontal direction or in a vertical direction) than would be possible without the incorporation of such a lens and/or (ii) have enhanced resolvability in one or more regions of interest and reduced resolvability elsewhere.

In a first aspect, a device is provided. The device includes a rotationally symmetric foveated lens. The rotationally symmetric foveated lens is configured to receive light from an environment. The rotationally symmetric foveated lens is also configured to produce an image at an image plane based on the received light. The device also includes an image sensor having an associated image sensor resolution. The image sensor is positioned at the image plane and configured to capture an image having an associated field of view of the environment. Based on a distortion profile of the rotationally symmetric foveated lens and the image sensor resolution, the captured image exhibits a first angular optical resolution in a central region of the field of view. Based on the distortion profile of the rotationally symmetric foveated lens and the image sensor resolution, the captured image also exhibits a second angular optical resolution in a peripheral region of the field of view. Further, based on the distortion profile of the rotationally symmetric foveated lens and the image sensor resolution, the captured image exhibits an intermediate angular optical resolution in an intermediate region of the field of view. The intermediate region of the field of view is between the central region of the field of view and the peripheral region of the field of view. The first angular optical resolution is enhanced relative to the second angular optical resolution. The intermediate angular optical resolution is between the first angular optical resolution and the second angular optical resolution.

In a second aspect, a method is provided. The method includes receiving, by a rotationally symmetric foveated lens, light from an environment. The method also includes producing, by the rotationally symmetric foveated lens, an image at an image plane based on the received light. Additionally, the method includes capturing, by an image sensor having an associated image sensor resolution, an image having an associated field of view of the environment. The image sensor is positioned at the image plane. Based on a distortion profile of the rotationally symmetric foveated lens and the image sensor resolution, the captured image exhibits a first angular optical resolution in a central region of the field of view. Based on the distortion profile of the rotationally symmetric foveated lens and the image sensor resolution, the captured image also exhibits a second angular optical resolution in a peripheral region of the field of view. Further, based on the distortion profile of the rotationally symmetric foveated lens and the image sensor resolution, the captured image exhibits an intermediate angular optical resolution in an intermediate region of the field of view. The intermediate region of the field of view is between the central region of the field of view and the peripheral region of the field of view. The first angular optical resolution is enhanced relative to the second angular optical resolution. The intermediate angular optical resolution is between the first angular optical resolution and the second angular optical resolution.

In a third aspect, a vehicle is provided. The vehicle includes a camera. The camera includes a rotationally symmetric foveated lens. The rotationally symmetric foveated lens is configured to receive light from an environment. The rotationally symmetric foveated lens is also configured to produce an image at an image plane based on the received light. The camera also includes an image sensor having an associated image sensor resolution. The image sensor is positioned at the image plane and configured to capture an image having an associated field of view of the environment. Based on a distortion profile of the rotationally symmetric foveated lens and the image sensor resolution, the captured image exhibits a first angular optical resolution in a central region of the field of view. Based on the distortion profile of the rotationally symmetric foveated lens and the image sensor resolution, the captured image also exhibits a second angular optical resolution in a peripheral region of the field of view. Further, based on the distortion profile of the rotationally symmetric foveated lens and the image sensor resolution, the captured image exhibits an intermediate angular optical resolution in an intermediate region of the field of view. The intermediate region of the field of view is between the central region of the field of view and the peripheral region of the field of view. The first angular optical resolution is enhanced relative to the second angular optical resolution. The intermediate angular optical resolution is between the first angular optical resolution and the second angular optical resolution.

These as well as other aspects, advantages, and alternatives will become apparent to those of ordinary skill in the

DETAILED DESCRIPTION

Figure 1:
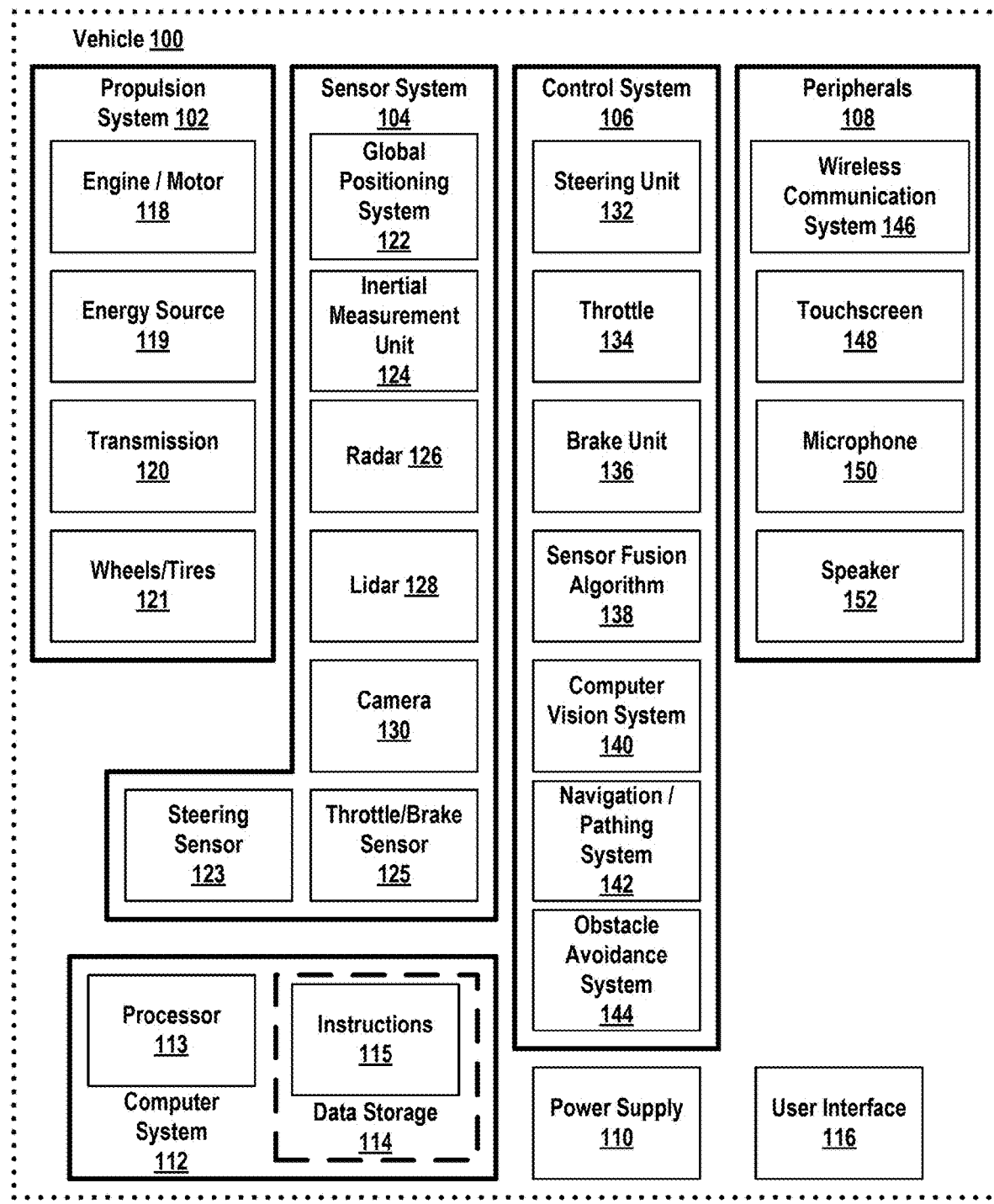
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, and terrain. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Cameras can have a variety of features that can distinguish one camera from another. For example, cameras and/or images captured by cameras may be identified by values such as aperture size, f-number, exposure duration/shutter speed, depth of field, focal length, International Organization for Standardization (ISO) sensitivity (or gain), pixel size, sensor resolution, etc. These features may be based on the lens, the image sensor, and/or additional components of the camera. Further, these features may also be adjustable within a single camera (e.g., the aperture of a lens on a camera can be adjusted between photographs). Additionally, one or more lenses of the camera can introduce a certain amount of distortion into the image captured by the camera. Traditionally, undesirable distortion may be present in a lens as a result of one or more countervailing design constraints, and it may be challenging to compensate for such undesirable distortion without significantly increasing the complexity of the camera.

In some applications (e.g., computer vision applications), it may be desirable to capture one or more images with a relatively wide field of view. For example, object detection and avoidance performed for a vehicle operating in an autonomous mode or semi-autonomous mode (e.g., a vehicle that includes one or more advanced driver-assistance systems (ADASs)) may include capturing images that include a field of view of a surrounding environment that spans an azimuthal range of about 120° and an elevation range of about 45°. Such a field of view may include vehicles, traffic signs, traffic signals, a road surface, pedestrians, hazards, and/or other objects in front of the vehicle (e.g., relative to a direction of travel of the vehicle), behind the vehicle (e.g., relative to a direction of travel of the vehicle), and/or partially adjacent to the vehicle (e.g., relative to a direction of travel of the vehicle). Additionally, in some applications, a desired angular optical resolution/ associated resolvability may not be constant across the entire field of view. Again taking the vehicle example, it may be desirable to have an increased angular optical resolution within the portion of the field of view directly in front of the vehicle (e.g., to enhance object detectability when making object avoidance determinations based on the captured image(s)) relative to the portion of the field of view that is adjacent to the vehicle (e.g., that corresponds to the objects not within the path of the vehicle).

In order to accommodate these disparate angular optical resolutions/associated resolvability constraints, some techniques include capturing multiple images (e.g., simultaneously) using multiple cameras. For example, a first camera having a lens with a lower degree of distortion (e.g., a telephoto lens) may be used to capture an image based on the central region of the field of view and a second camera having a lens with a higher degree of distortion (e.g., a wide-angle lens) may be used to capture a different image based on the peripheral region of the field of view. These images may be stitched together, in some cases, in order to generate a composite image of the surrounding environment. Such techniques can have certain disadvantages, though. First and foremost, such techniques inherently include two separate cameras, each including its own image sensor and lens. Since two separate cameras are used, it can be challenging to align the separately captured images to ensure that a contiguous field of view is presented (e.g., within a composite image). Further, using two separate cameras may increase the financial cost and/or time required to fabricate/ align the system. Additionally, it may be challenging to ensure that both images are captured precisely simultaneously in applications where such simultaneous capture is desired. Still further, such techniques include a binary distortion profile. Namely, a uniform distortion is applied by a first lens (e.g., the telephoto lens) to produce a first image and a different uniform distortion is applied by a second lens (e.g., the wide-angle lens) to produce a second image. It may be desirable to have a distortion gradient (rather than two discrete distortions) in order to transition from the desired distortion for the central portion of the field of view to the desired distortion for the peripheral portion of the field of view.

Example embodiments disclosed herein address many of the shortcomings described above. In particular, example embodiments may include a camera used to capture images of an environment (e.g., of an environment surrounding a vehicle). The camera may include a foveated lens used to produce an image at an image plane that is detected by an image sensor. The foveated lens may include a distortion profile that has a first degree of distortion corresponding to a central region of the field of view and a second degree of distortion (e.g., −55%, −60%, −65%, −70%, −75%, or −80%, as measured from f·tan (θ), where f is the focal length) corresponding to a peripheral region of the field of view. The first degree of distortion may be less than the second degree of distortion (i.e., an absolute value of the second degree of distortion may be greater than an absolute value of the first degree of distortion). For example, the first degree of distortion may be 0%, −5%, −10%, −15%, or −20%. Further, the central region of the field of view may correspond to a forward or reverse direction of a vehicle (e.g., a direction of travel of a vehicle). Unlike alternative techniques, the techniques described herein may capture a relatively wide field of view (e.g., 120° in azimuth by 45° in elevation) using only a single camera (with a single lens) while still maintaining a non-uniform distortion profile across the field of view. Further, given the use of the foveated lens along with an associated image sensor (e.g., an image sensor having a relatively high image sensor resolution, such as 15 megapixels (MP)-20 MP), a single image may be captured that spans the entire field of view of the surrounding environment but also includes different angular optical resolutions (e.g., measured in units of degrees/pixel or radians/pixel) in different regions of the field of view (e.g., corresponding to the distortion profile across the foveated lens).

In some embodiments (e.g., for ease of fabrication and/or installation), the foveated lens may be rotationally symmetric. This may include the foveated lens being physically rotationally symmetric (e.g., one or more lens elements of the foveated lens have a rotationally isotropic shape about a principal axis of the foveated lens and/or have rotationally isotropic material properties about a principal axis of the foveated lens). Additionally or alternatively, the foveated lens being rotationally symmetric may include the foveated lens exhibiting a distortion profile that is rotationally isotropic about a principal axis of the foveated lens.

In some embodiments, the foveated lens may be a lens assembly. For example, the foveated lens may include multiple lens elements positioned relative to an aperture and/or inside of a lens holder (e.g., made of aluminum, such as an aluminum alloy like 6061-T6). In some embodiments, the lens assembly may include one or more aspheric lens elements. For example, the lens assembly may include a first aspheric lens (e.g., having positive optical power) positioned near an entrance to the foveated lens and a second aspheric lens (e.g., having negative optical power) positioned near the image sensor. In such embodiments, an aperture stop of the foveated lens may be located in between the two aspheric lenses. The foveated lens may include lens elements fabricated using molded optical plastics (e.g., polymers). However, in some embodiments (e.g., for enhanced stability or thermal performance), one or more lens elements of the lens assembly may instead be fabricated from molded optical glass. In such embodiments, the lens elements may be designed to have a diameter of less than 25 mm. Additionally or alternatively, one or more components of the foveated lens (e.g., one or more of the individual lens elements within a lens assembly) may be fabricated from materials that enhance athermalization and/or may be shaped in such a way to enhance athermalization.

In addition, in order to ensure sufficient angular optical resolution (and corresponding resolvability) across the entire image sensor (e.g., based on the engineered distortion profile of the foveated lens), the image sensor may have a relatively high resolution (e.g., 13MP, 14MP, 15MP, 16MP, 17 MP, 18MP, 19MP, 20MP, or more). Further, in order to capture the full field of view produced at the image plane, the image sensor may have an aspect ratio of 2 or more: 1 (width:height). These design features combined with the distortion profile of the foveated lens described above may correspond to an angular optical resolution of less than 250 μrad/pixel (e.g., less than 225 μrad/pixel, less than 200 μrad/pixel, less than 175 μrad/pixel, less than 150 μrad/pixel, less than 125 μrad/pixel, or less than 100 μrad/pixel) in the central portion of the field of view and/or an angular optical resolution of greater than 300 μrad/pixel (e.g., greater than 400 μrad/pixel, greater than 500 μrad/pixel, greater than 600 μrad/pixel, greater than 700 μrad/pixel, greater than 800

μrad/pixel, greater than 900 μrad/pixel, or greater than 1000 μrad/pixel) in the peripheral portion of the field of view.

Additionally or alternatively, in some embodiments, it may be desirable to offset the field of view relative to the surrounding environment (e.g., relative to a principal axis of the foveated lens). For example, in automotive applications, it may be beneficial to have asymmetry relative to the horizon in an elevation direction (e.g., in order to capture additional content at higher elevation angles and less content at lower elevation angles, such as capturing traffic lights at 30° relative to the horizon and a road surface at only −15° relative to the horizon). In such cases, the image sensor may be positioned off-center relative to the principal axis of the foveated lens. For example, a vertical center of the image sensor may be positioned vertically below the principal axis of the foveated lens (e.g., 0.5 mm below, 1.0 mm below, or 1.5 mm below) in order to offset the elevation range for the captured field of view. Horizontal offsets relative to the principal axis of the foveated lens are also possible and are contemplated herein.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speed-bumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208 and 210), to actively scan the environment near the back of the vehicle 200 for the presence of radio-reflective objects. Similarly, one or more radars can be located near the front of the vehicle 200 (e.g., sensor systems 212 or 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
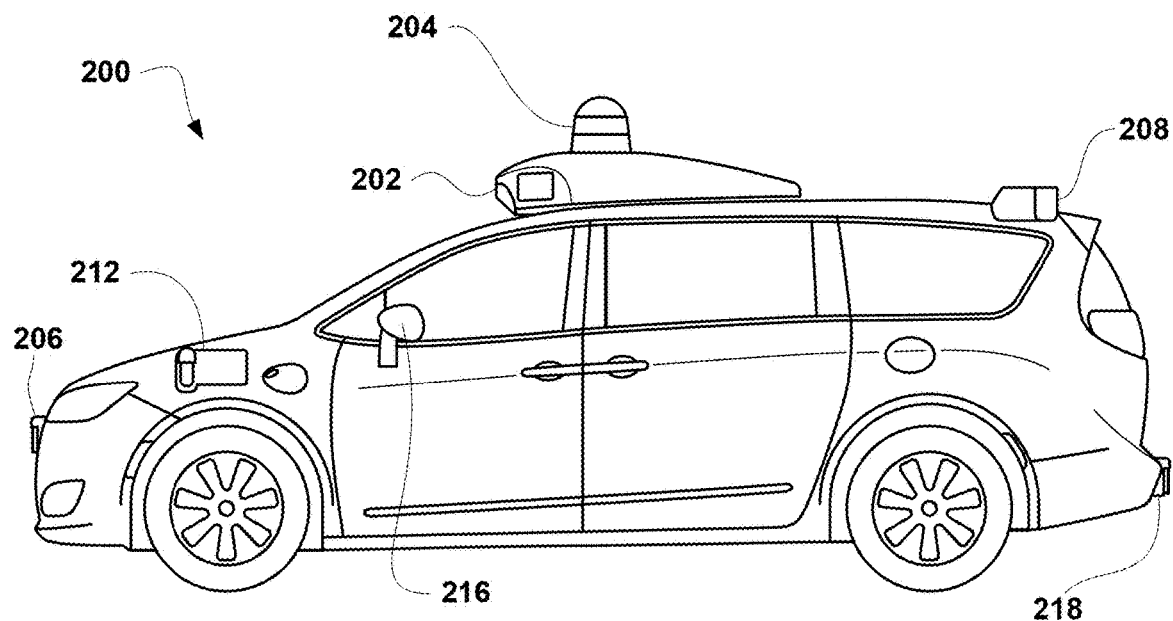
FIG. 2A is an illustration of a physical configuration of a vehicle, according to example embodiments.
Figure 2B:
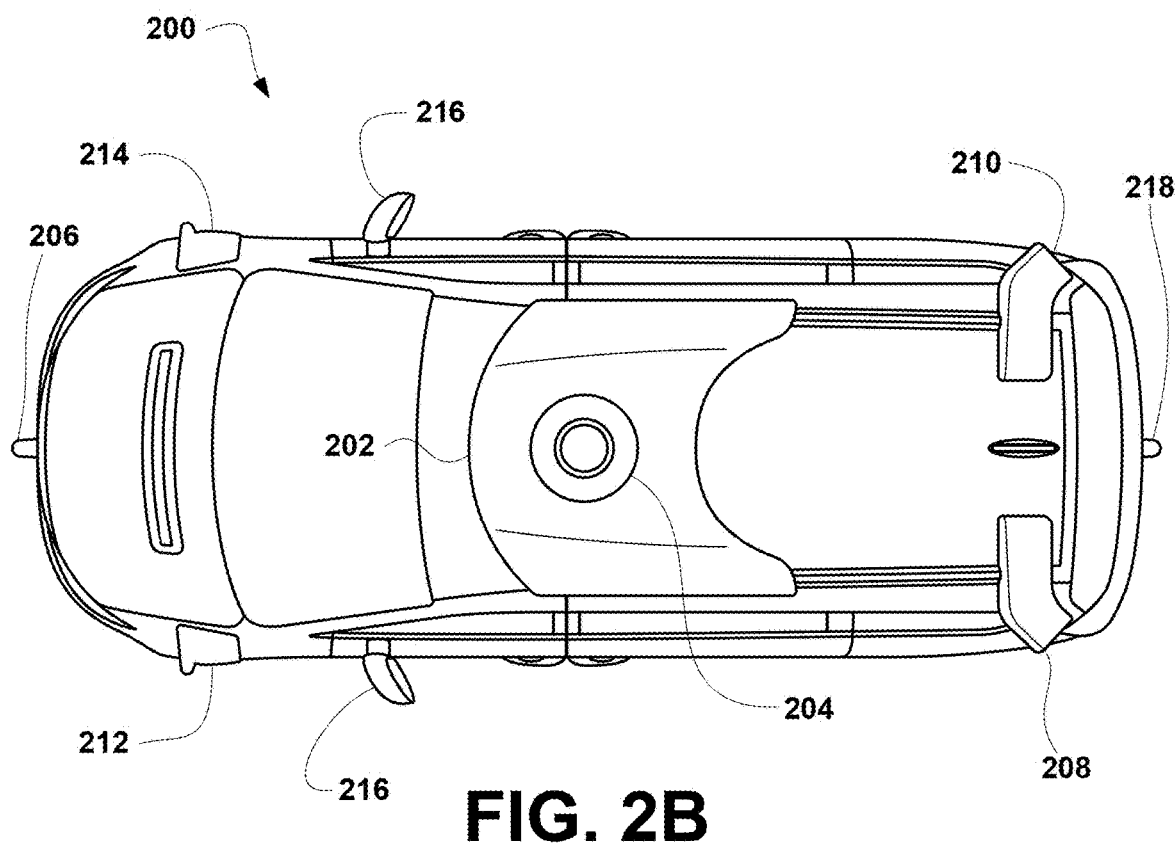
FIG. 2B is an illustration of a physical configuration of a vehicle, according to example embodiments.
Figure 2C:
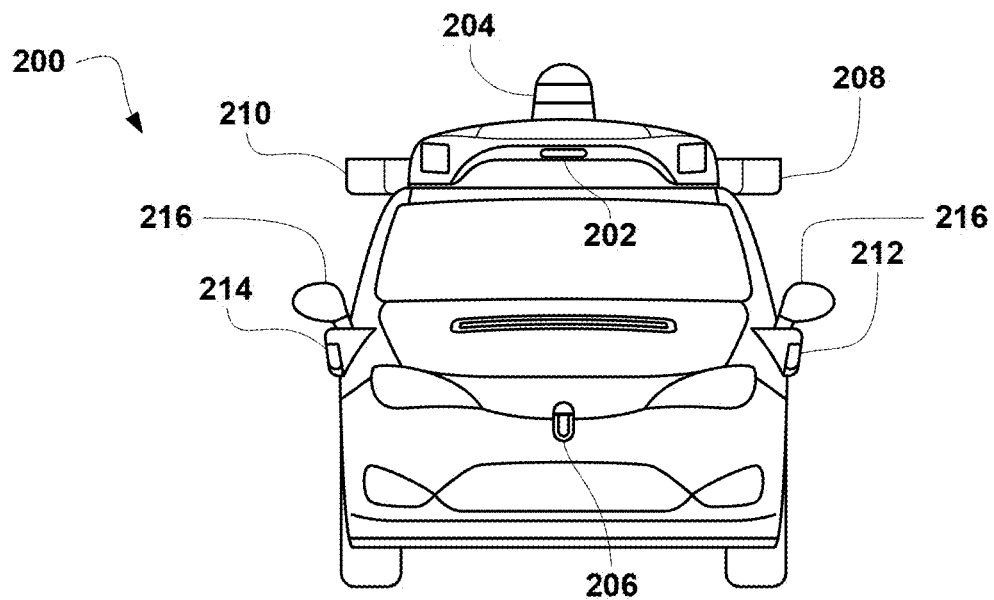
FIG. 2C is an illustration of a physical configuration of a vehicle, according to example embodiments.
Figure 2D:
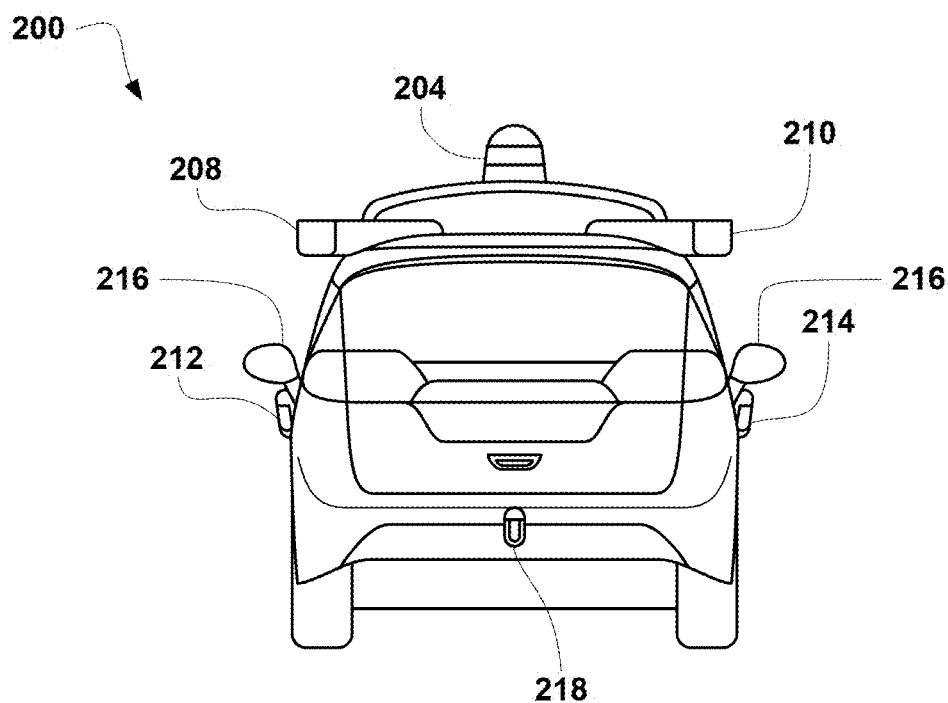
FIG. 2D is an illustration of a physical configuration of a vehicle, according to example embodiments.
Figure 2E:
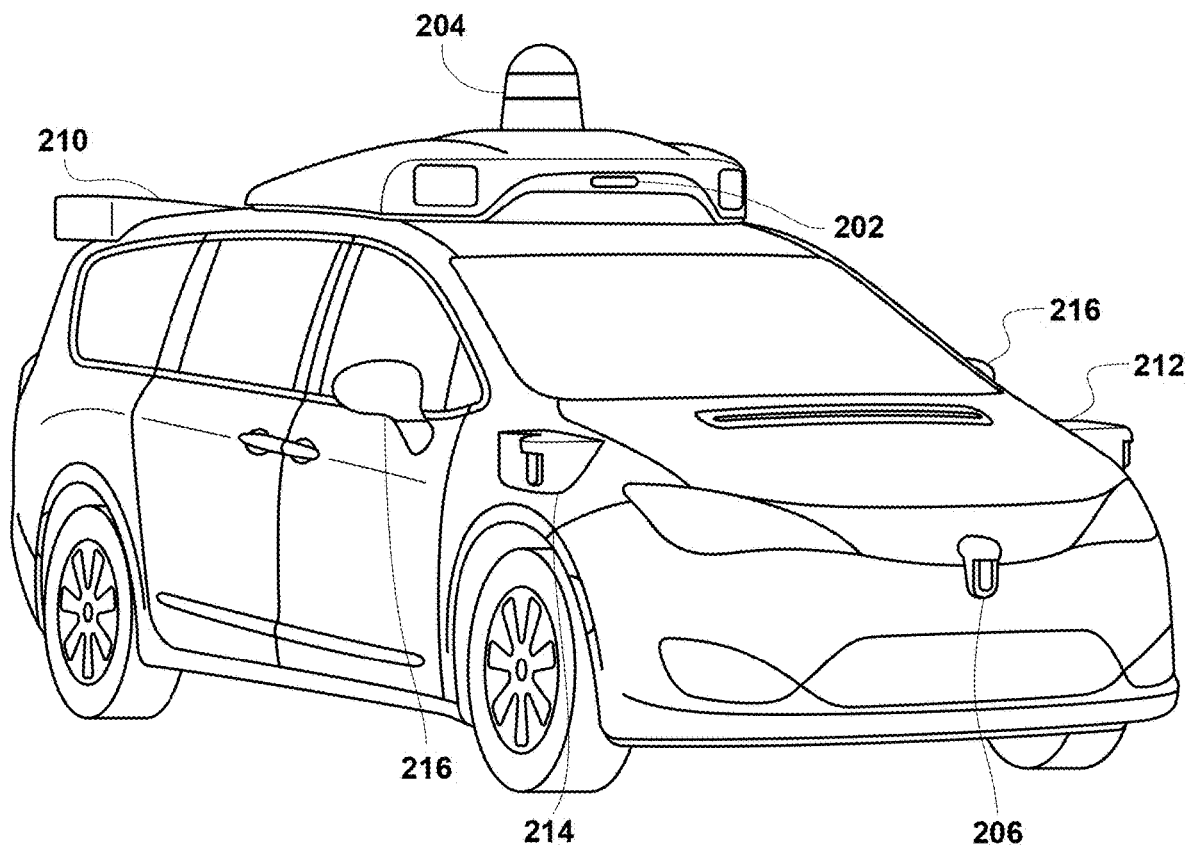
FIG. 2E is an illustration of a physical configuration of a vehicle, according to example embodiments.
Figure 2F:
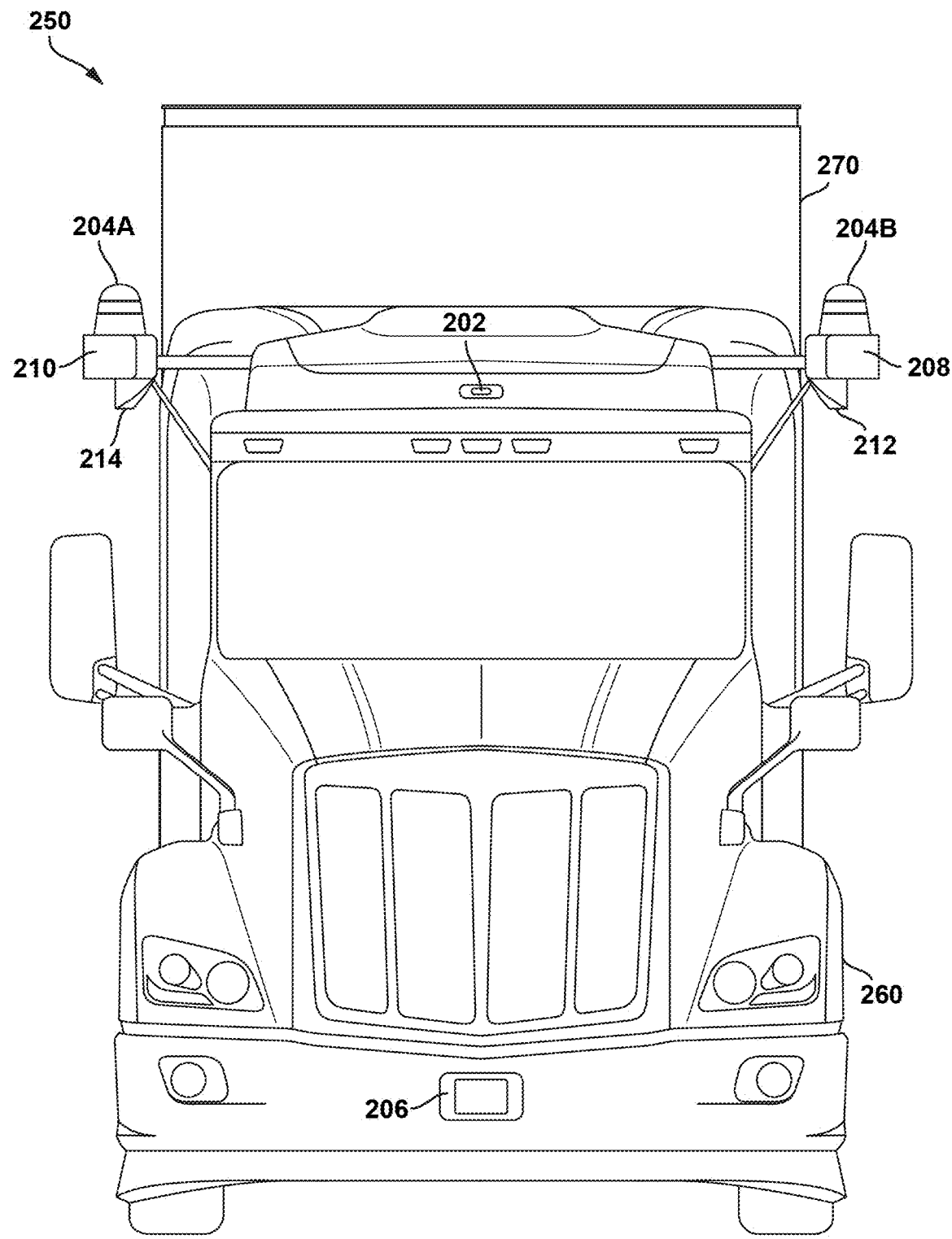
FIG. 2F is an illustration of a physical configuration of a vehicle, according to example embodiments.
Figure 2G:
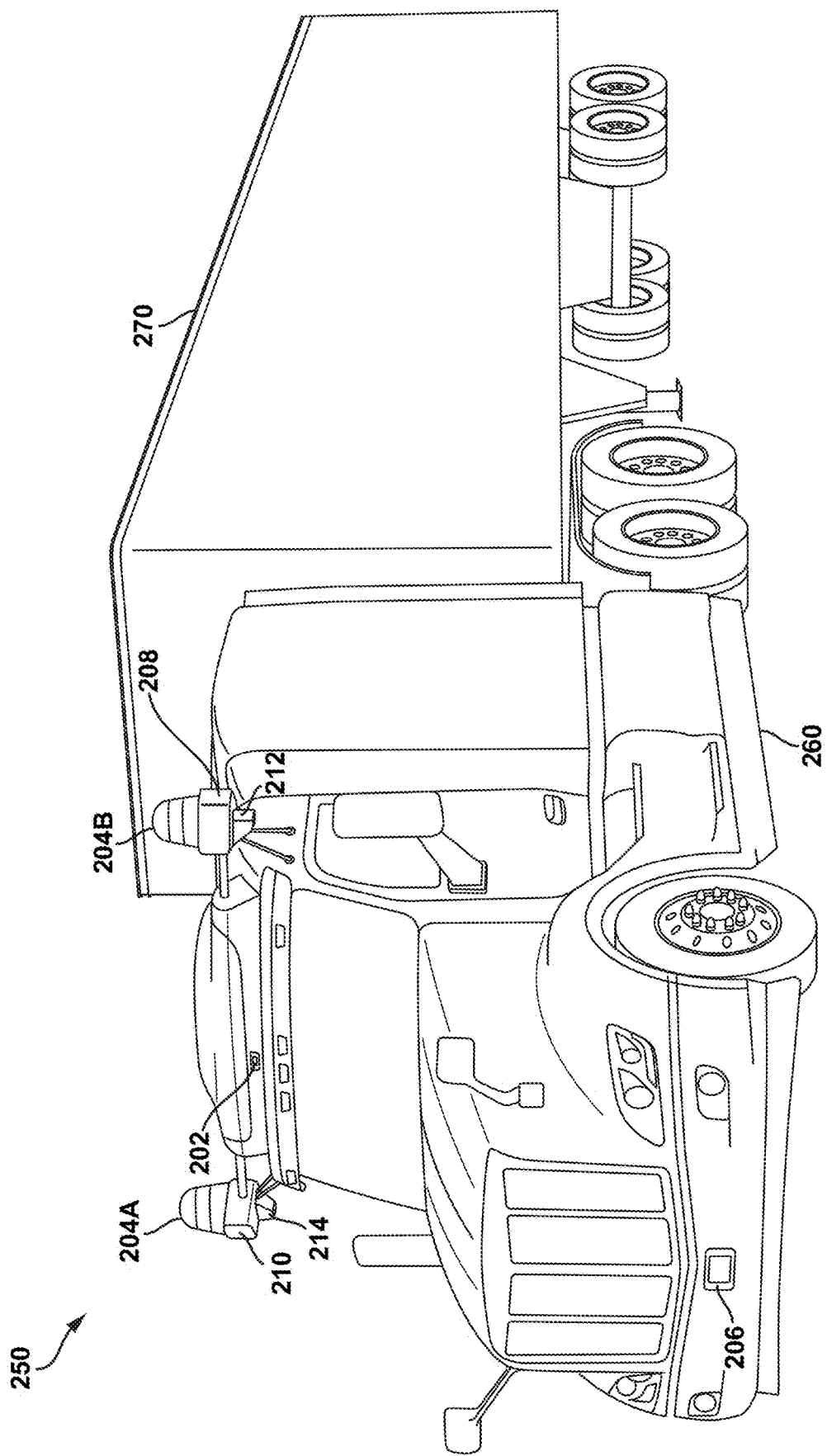
FIG. 2G is an illustration of a physical configuration of a vehicle, according to example embodiments.
Figure 2H:
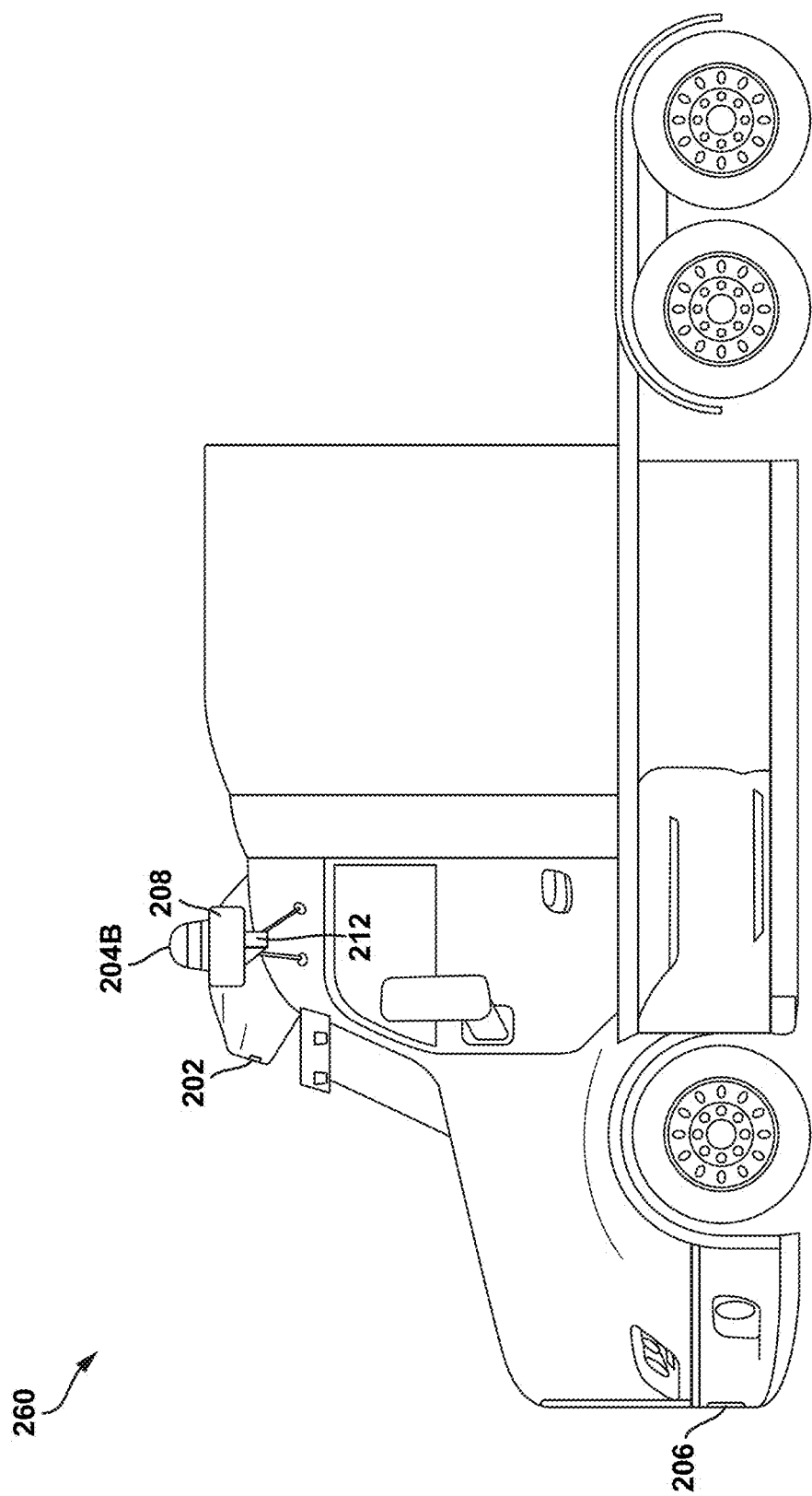
FIG. 2H is an illustration of a physical configuration of a vehicle, according to example embodiments.
Figure 2I:
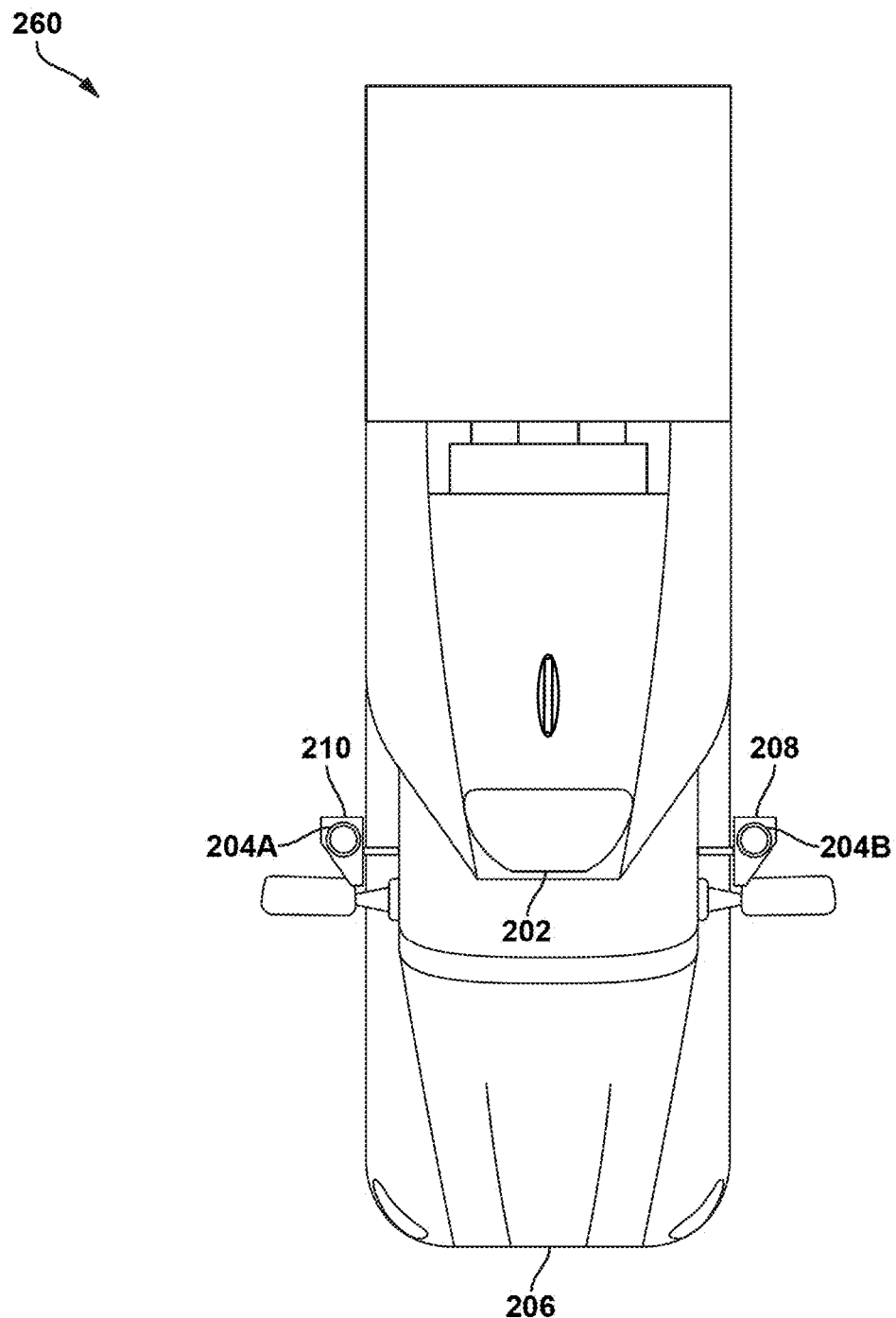
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

Figure 2J:
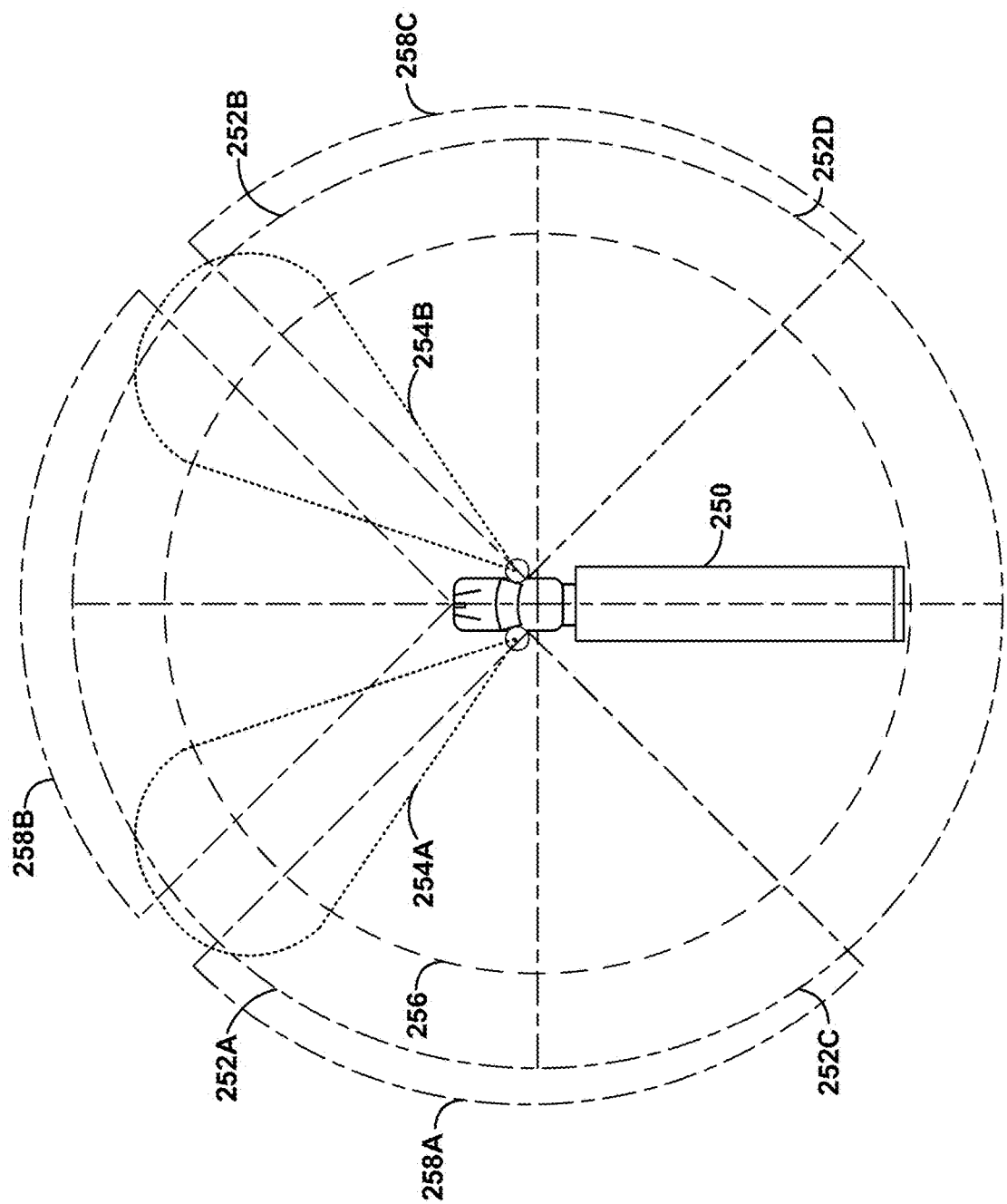
FIG. 2J is an illustration of a field of view for various sensors, according to example embodiments.

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
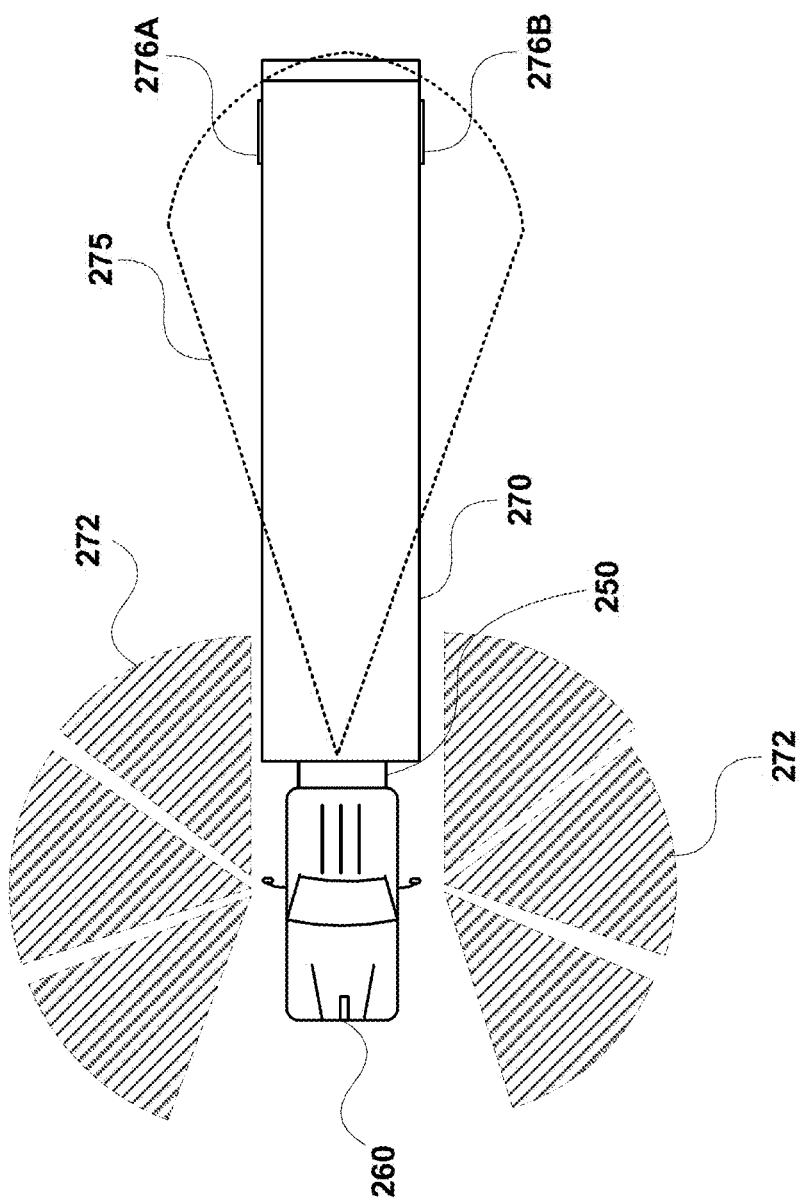
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
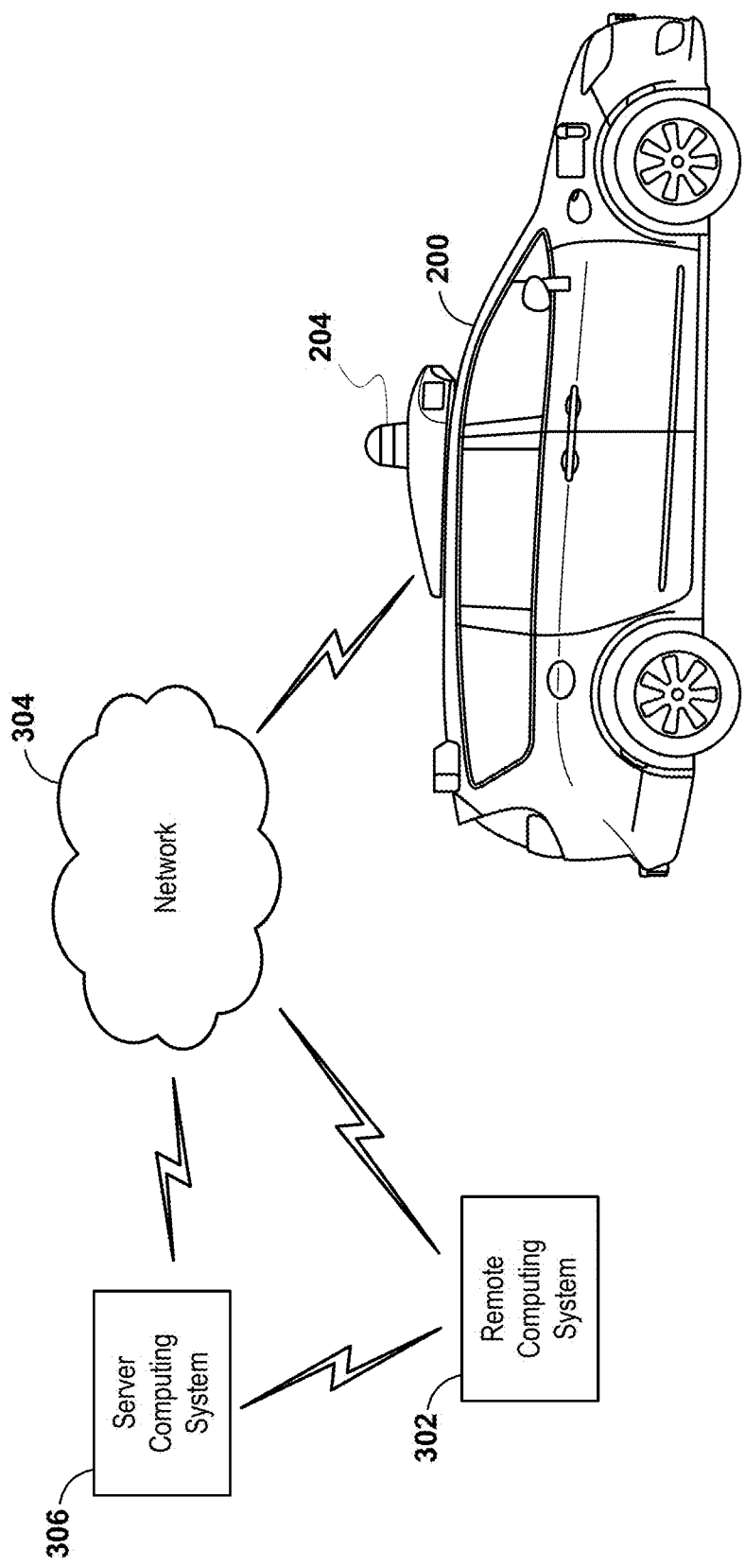
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
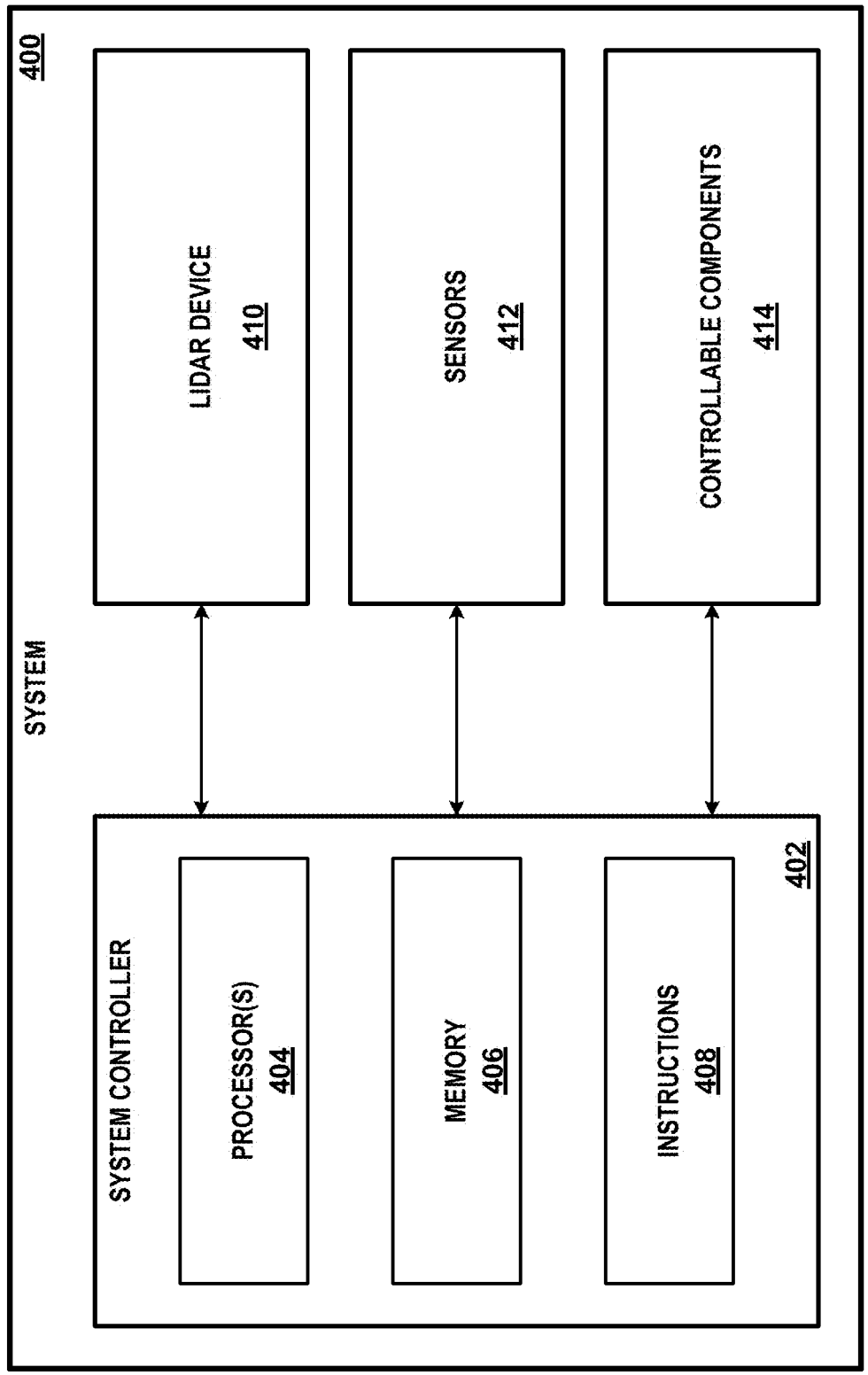
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, and proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
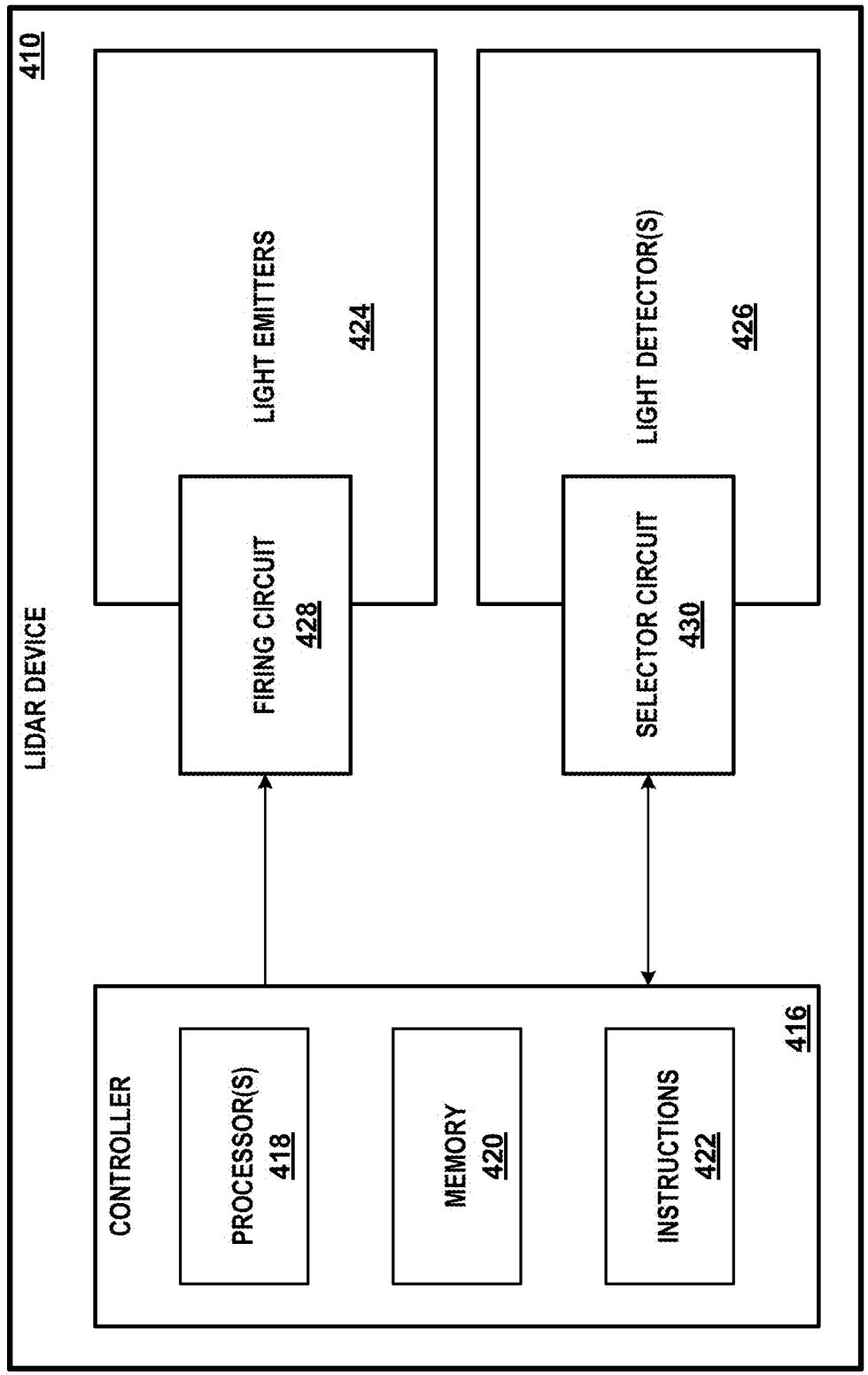
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, or construction cones. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

Figure 5A:
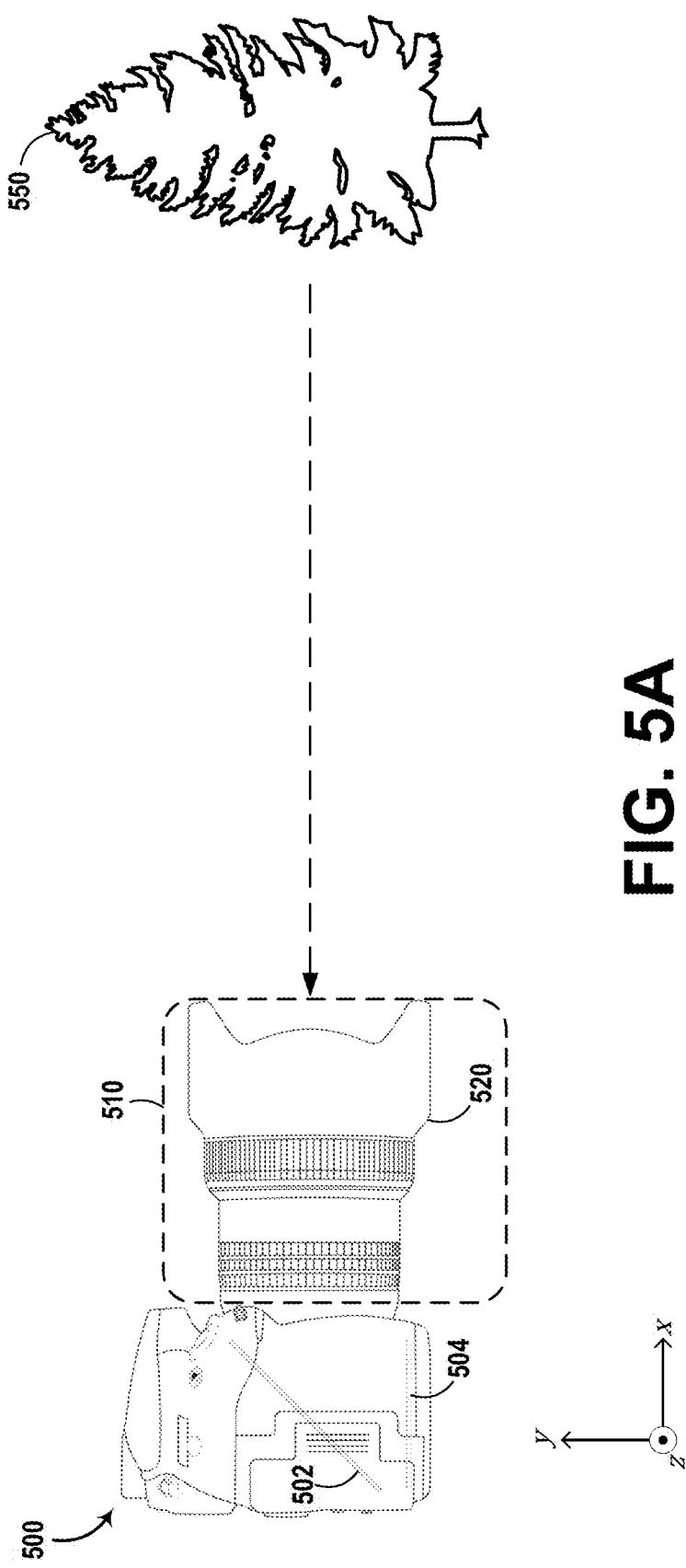
FIG. 5A is an illustration of a camera capturing an image of an environment, according to example embodiments.

FIG. 5A is an illustration of a camera 500 capturing an image of an environment 550, according to example embodiments. The camera 500 may be the camera 130 of the sensor system 104 of the vehicle 100 as shown and described above with reference to FIG. 1. Further, the camera 500 may include one or more lens elements (not visible) housed within a lens holder 520 (e.g., lens barrel) of the camera 500. For example, the camera 500 may include one or more foveated lenses 510 (e.g., as described further below). The camera 500 may also include an image sensor 504.

The image sensor 504 may include a CCD or a CMOS sensor. For example, the image sensor 504 may include an array of light-sensitive pixels configured to absorb light and provide electrical output based on the absorbed light. The electrical output of each of the light-sensitive pixels may then be stored (e.g., in a memory, such as a non-volatile memory) as a captured image (e.g., in a given file format, such as .JPEG, PNG, BMP, TIFF, .GIF, .PDF, . RAW, and.EPS). In some embodiments, the light-sensitive pixels of the image sensor 504 may have various areal sizes. For example, each of the light-sensitive pixels may have light-sensitive surfaces shaped as squares that have an areal size of less than 6.25 µm² (e.g., 4.41 µm²). Further, each of the light-sensitive pixels in the image sensor 504 may have a uniform (i.e., the same) areal size. In some embodiments, the image sensor 504 may have a relatively large image sensor resolution (e.g., between 13 MP and 20 MP, such as 17 MP). Additionally, the aspect ratio of the image sensor 504 may be non-square. For example, the image sensor 504 may have a greater number of light-sensitive pixels in one dimension (e.g., the horizontal dimension/z-direction illustrated in FIG. 5A) than in another dimension (e.g., the vertical dimension/y-direction illustrated in FIG. 5A). This may allow for the aspect ratio of captured images (and, correspondingly, a captured field of view of the environment 550) to also be non-square. For example, the image sensor 504 may have an aspect ratio, in width:height, of at least 1:4, 1:3, 1:2, 1:1.75, 1:1.5, 1:1.25, 1:1.1, 1.1:1, 1.25:1, 1.5:1, 1.75:1, 2:1, 3:1, or 4:1. In conjunction with the engineered distortion profile of a foveated lens of the camera 500 (described below), an aspect ratio other than 1:1 may allow the field of view of captured images to include a wider angular range in one direction (e.g., in azimuth) than in another direction (e.g., in elevation). For example, images captured by the image sensor 504 may capture a field of view that spans between 90° and 150° (e.g., at least) 120° in azimuth and spans between 30° and 60° (e.g., at least) 45° in elevation.

The image sensor 504 may receive light from the environment 550 via the one or more lens elements housed within the lens holder 520 and/or via a mirror 502. In some embodiments, the camera 500 may also include additional components (e.g., shutter buttons, viewfinders, flashes, batteries, electronic storage for recording captured images, display screens, and selection buttons). Further, in some embodiments, the mirror 502 may be movable (e.g., the mirror 502 may rotate relative to the foveated lens 510 such that light from the environment 550 can be selectively directed to a viewfinder of the camera 500 or to the image sensor 504 of the camera 500).

It is understood that the environment 550 shown in FIG. 5A is provided merely for illustrative purposes and is not intended to imply that the environment 550 must include solely a tree or even must include a tree at all. Further, the environment 550 captured by the camera 500 may include multiple objects. In some embodiments, for example, the environment 550 captured by the camera 500 may include a series of objects surrounding a vehicle (e.g., a vehicle on which the camera 500 is mounted) operating in an autonomous or semi-autonomous mode. For example, the environment 550 may include traffic signals, street lights, road surfaces, roadside signs, pedestrians, animals, plants, other vehicles, weather features (e.g., snow, sleet, hail, and rain), dust, bicycles, etc.

In some embodiments, one or more of the camera 500 components may be controlled manually by a user of the camera 500. For example, the lens holder 520 may be configured to rotate about its axis to modify the relative positions of the one or more lens elements within the lens holder 520, thereby adjusting a field of view and/or a zoom of the camera 500. Alternatively, one or more of the components of the camera 500 may be electronically controlled (e.g., a camera controller may adjust one or more of the lens elements within the lens holder 520 to modify a zoom of the camera 500, such as during an auto-focus procedure, may adjust a sensitivity level of the image sensor 504, and may adjust other exposure settings of the camera 500).

While a digital single-lens reflex (DSLR) camera is illustrated in FIG. 5A, it is understood that FIG. 5A is solely provided as an example and other embodiments are contemplated herein. In alternative embodiments, other form factors may be used. For example, in some embodiments, the camera 500 may only include an image sensor behind one or more lenses (e.g., a telecentric lens). Other arrangements are also possible. In some embodiments, for instance, the camera may include one or more optical filters (e.g., polarization filters, chromatic filters, and neutral-density filters) and/or one or more electronic stages and/or motors configured to adjust the position of one or more components of the camera. Further, in some embodiments, the camera 500 may be used for object detection and avoidance within a vehicle operating in an autonomous or semi-autonomous mode (e.g., like the camera 130 illustrated and described with reference to FIG. 1). It is understood that the techniques described herein may be applicable to any form factor of camera and/or image sensor. For example, the techniques described herein are applicable to vehicle cameras (e.g., cameras used for object detection and avoidance, and backup cameras), webcams, cellphone cameras, DSLRs (as illustrated in FIG. 5A), closed-circuit television cameras, highspeed cameras, etc. Additionally, the techniques described herein may equally be applied to cameras that digitally record images as well as cameras that chemically record images (e.g., on film).

Figure 5B:
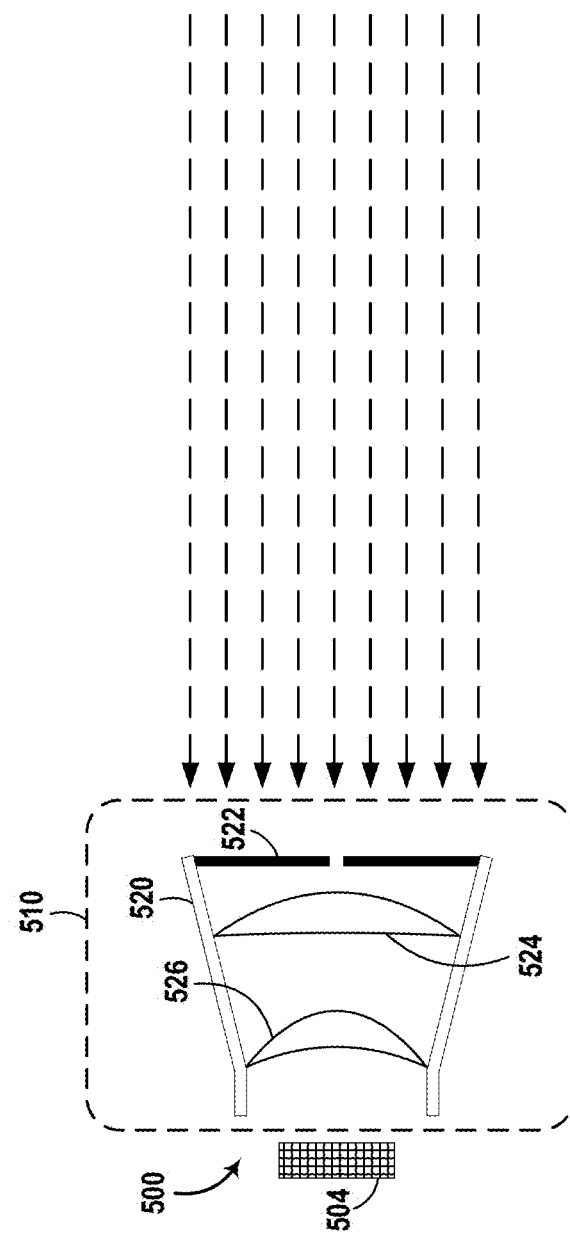
FIG. 5B is a simplified illustration of a camera capturing an image of an environment, according to example embodiments.

FIG. 5B is a simplified illustration of a camera 500 capturing an image of an environment 550, according to example embodiments. The camera 500 illustrated in FIG. 5B may be a simplified rendering of the same camera 500 illustrated in FIG. 5A, for example. As illustrated, the camera 500 may include the image sensor 504, the foveated lens 510, and the lens holder 520. The lens holder 520 is shown in a cutaway view (e.g., such that components interior to the lens holder 520 are visible. As illustrated, an aperture stop 522 (e.g., a plate having an adjustable iris therein), a first lens element 524 (e.g., a first aspheric lens), and a second lens element 526 (e.g., a second aspheric lens) may be located inside the lens holder 520. Further, in some embodiments the lens holder 520 may be fabricated to provide thermal stability (e.g., in order to counteract thermal expansion/contraction affecting the behavior of the foveated lens 510). For example, the lens holder 520 may be fabricated from aluminum (e.g., an aluminum alloy like 6061-T6).

In some embodiments, the combination of the lens holder 520 and any components interior to the lens holder 520 (e.g., the aperture stop 522, the first lens element 524, and the second lens element 526) may be collectively referred to as a foveated lens 510. In other embodiments, however, "the foveated lens" may refer only to the one or more lens elements making up the lens assembly (e.g., and may not include any lens holder and/or other optical elements, such as apertures, mirrors, and filters). In still other embodiments, depending on context, "the foveated lens" may refer to a single lens element (e.g., a single aspheric lens element) used to produce a specified distortion profile.

Additionally, the first lens element 524, the second lens element 526, and the aperture stop 522 may be the primary optical elements included in the foveated lens 510, in some embodiments. However, it is understood that the position, shape, and relative size of the first lens element 524, the second lens element 526, and the aperture stop 522 are provided for illustrative purposes only and may be different in various embodiments. For example, the relative scales, the relative locations, and/or the relative shapes of the first lens element 524, the second lens element 526, and/or the aperture stop 522 may be different than illustrated in FIG. 5B in various embodiments (e.g., as shown and described with reference to FIG. 5C). Additionally or alternatively, it is understood that the foveated lens 510 may include additional elements (e.g., additional lens elements, as shown and described below with reference to FIG. 5C).

Figure 5C:
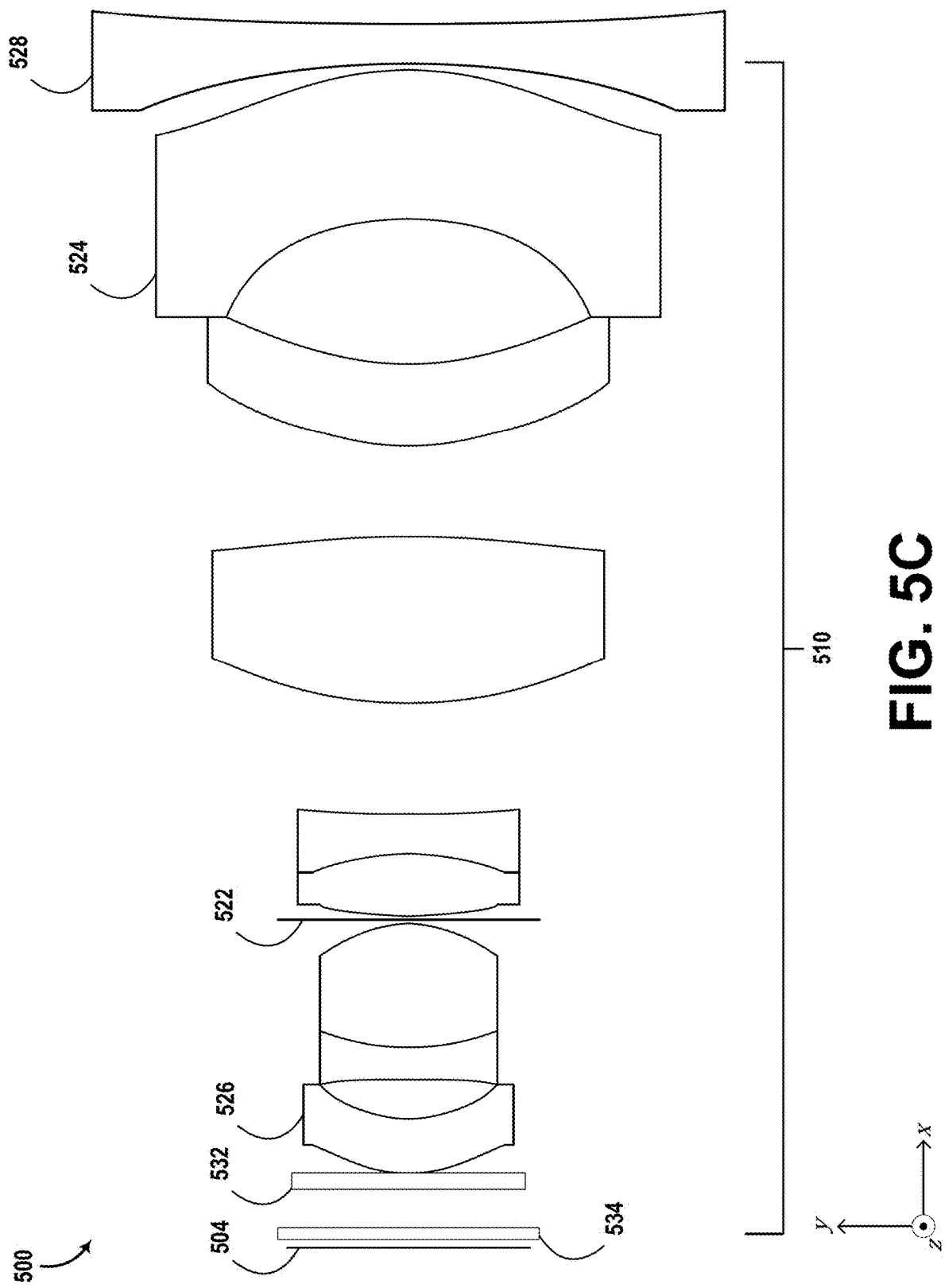
FIG. 5C is a cutaway, side-view illustration of a foveated lens and an image sensor, according to example embodiments.

FIG. 5C is a cutaway, side-view illustration of a foveated lens (e.g., the foveated lens 510 shown and described with reference to FIGS. 5A and 5B) and an image sensor (e.g., the image sensor 504 shown and described with reference to FIGS. 5A and 5B), according to example embodiments. The foveated lens 510 and the image sensor 504 may be components of a camera (e.g., the camera 500 shown and described with reference to FIGS. 5A and 5B). For illustrative purposes (e.g., to avoid cluttering the drawing), the lens holder 520 is not shown in FIG. 5C. Further, additional lens elements within the lens assembly of the foveated lens 510 that were not shown in FIG. 5B have been illustrated in FIG. 5C.

As shown, the foveated lens 510 may include the aperture stop 522, the first lens element 524, the second lens element 526, and a third lens element 528. As also illustrated, the foveated lens 510 may include one or more additional, unlabeled lens elements (e.g., spherical lenses, aspheric lenses, convex lenses, concave lenses, lenses having positive optical power, and lenses having negative optical power). As illustrated, in some embodiments the first lens element 524 and the second lens element 526 may be positioned on opposite sides of the aperture stop 522 from one another within the foveated lens 510. As also illustrated, the image sensor 504 may be positioned nearer to the second lens element 526 than the first lens element 524. The lens elements of the foveated lens 510 (e.g., the first lens element 524, the second lens element 526, the third lens element 528, and/or any of the unlabeled elements) may be fabricated from molded optical glass and/or molded optical plastic. Still further, in some embodiments, the foveated lens 510 may include one or more optical elements (e.g., filters, polarizers, mirrors, and waveguides) in addition to or instead of those illustrated in FIG. 5C. The foveated lens 510 illustrated in FIG. 5C may, for instance, be a rotationally symmetric foveated lens (e.g., a distortion profile of the foveated lens 510 is rotationally, but not radially, isotropic about a principal axis of the foveated lens).

In some embodiments, light from an external environment (e.g., the environment 550 shown and described with reference to FIGS. 5A and 5B) may enter the foveated lens 510 via the third lens element 528 (i.e., the third lens element 528 may be positioned between the rest of the elements of the foveated lens 510 and the environment 550). The third lens element 528 may be a spherical lens and/or may have positive optical power in various embodiments.

Upon being transmitted through the third lens element 528, the light from the environment 550 may be conveyed to the first lens element 524 (e.g., through one or more intermediate lens elements or other optical elements). The first lens element 524 may include an aspheric lens (e.g,. an aspheric lens having an engineered distortion profile to accommodate, in conjunction with the remaining lens elements and the characteristics of the image sensor 504, a desired field of view and angular optical resolution profile of the environment 550). Additionally, the first lens element 524 may have negative optical power. Further, the first lens element 524 may have a diameter of between less than 30 mm, less than 25 mm, or less than 20 mm.

Upon being transmitted through the first lens element 524, the light from the environment 550 may be conveyed to the aperture stop 522 (e.g., having an aperture, such as an adjustable aperture, defined therein). In some embodiments, the light from the environment 550 may be conveyed from the first lens element 524 to the aperture stop 522 through one or more intermediate lens elements (e.g., spherical lenses, aspheric lenses, convex lenses, concave lenses, lenses having positive optical power, and lenses having negative optical power) and/or other optical elements.

Upon being transmitted through the aperture defined within the aperture stop 522, the light from the environment 550 may be conveyed to the second lens element 526 (e.g., through one or more intermediate lens elements or other optical elements). The second lens element 526 may include an aspheric lens (e.g., an aspheric lens having an engineered distortion profile to accommodate, in conjunction with the remaining lens elements and the characteristics of the image sensor 504, a desired field of view and angular optical resolution profile of the environment 550). Additionally, the second lens element 526 may have positive optical power. Further, the second lens element 526 may have a diameter of less than 15 mm, less than 12.5 mm, or less than 10 mm.

Upon being transmitted through the second lens element 526, the light from the environment 550 may be conveyed from the foveated lens 510 to the image sensor 504. In some embodiments, the light from the environment 550 may be conveyed from the second lens element 526 to the image sensor 504 through one or more other optical elements. For example, as illustrated in FIG. 5C, the light may be conveyed to the image sensor 504 through an infrared cutoff filter 532 and through cover glass 534 that overlays the image sensor 504.

In some embodiments, the foveated lens 510 may be between 15 mm and 45 mm (e.g. 30 mm) tall (e.g., in the y-direction illustrated in FIG. 5C) at its tallest (e.g., at an entrance to the foveated lens 510 at the third lens element 528). For example, the diameter of the third lens element 528 may be 30 mm. Additionally or alternatively, the combination of the foveated lens 510 and the image sensor 504 may span between 45 mm and 75 mm (e.g., 60 mm) in the x-direction illustrated in FIG. 5C. As a result of the arrangement illustrated, the foveated lens 510 may exhibit a number of optical characteristics. For example, the foveated lens 510 may have a focal length of between 5 mm and 20 mm (e.g., 10 mm). Additionally or alternatively (e.g., based on a size of the aperture defined within the aperture stop 522), the foveated lens 510 may have an f-number of between f/1.4 and f/2.8 (e.g., f/2). It is understood that the foveated lens 510 arrangement shown and described with reference to FIG. 5C is provided solely as an example and other embodiments are also possible and are contemplated herein.

The foveated lens 510 arrangement illustrated in FIG. 5C may provide a desired distortion profile (e.g., a non-uniform distortion profile). For example, the distortion profile may range (e.g., non-linearly) from 0% distortion at a central region of a field of view to between −55% and −75% (e.g., −65%) at a peripheral region of the field of view (e.g., which corresponds to 60° in azimuth from the center of the field of view). The distortion profile, along with the position of the image sensor 504, may result in a non-uniform angular optical resolution across the image sensor 504 (e.g., thereby also resulting in images captured by the image sensor 504 exhibiting non-uniform image distortion across the field of view).

Additionally, based on the arrangement of the foveated lens 510 and the image sensor 504 (e.g., and the aspect ratio of the image sensor 504), the image sensor 504 may capture a field of view that is wider (e.g., in azimuth) than it is tall (e.g., in elevation). For example, the captured field of view may be between 90° and 150° wide (e.g., 120° wide) and between 30° and 60° tall (e.g., 45° tall).

It is understood that the arrangement illustrated in FIG. 5C is one of numerous possible embodiments. For example, other numbers of lens elements, shapes of lens elements, or relative positions of lens elements are also possible. In some embodiments, for instance, the position of the third lens element 528 and the first lens element 524 may be swapped (i.e., the light from the environment 550 may enter the foveated lens 510 through an aspheric lens rather than through a spherical lens). In some embodiments, the aspheric lenses (e.g., the first lens element 524 and the second lens element 526) in the foveated lens 510 may be of differently signed optical powers (e.g., one having positive optical power and another having negative optical power) or of the similarly signed optical powers (e.g., both having negative optical power or both having positive optical power).

Figure 5D:
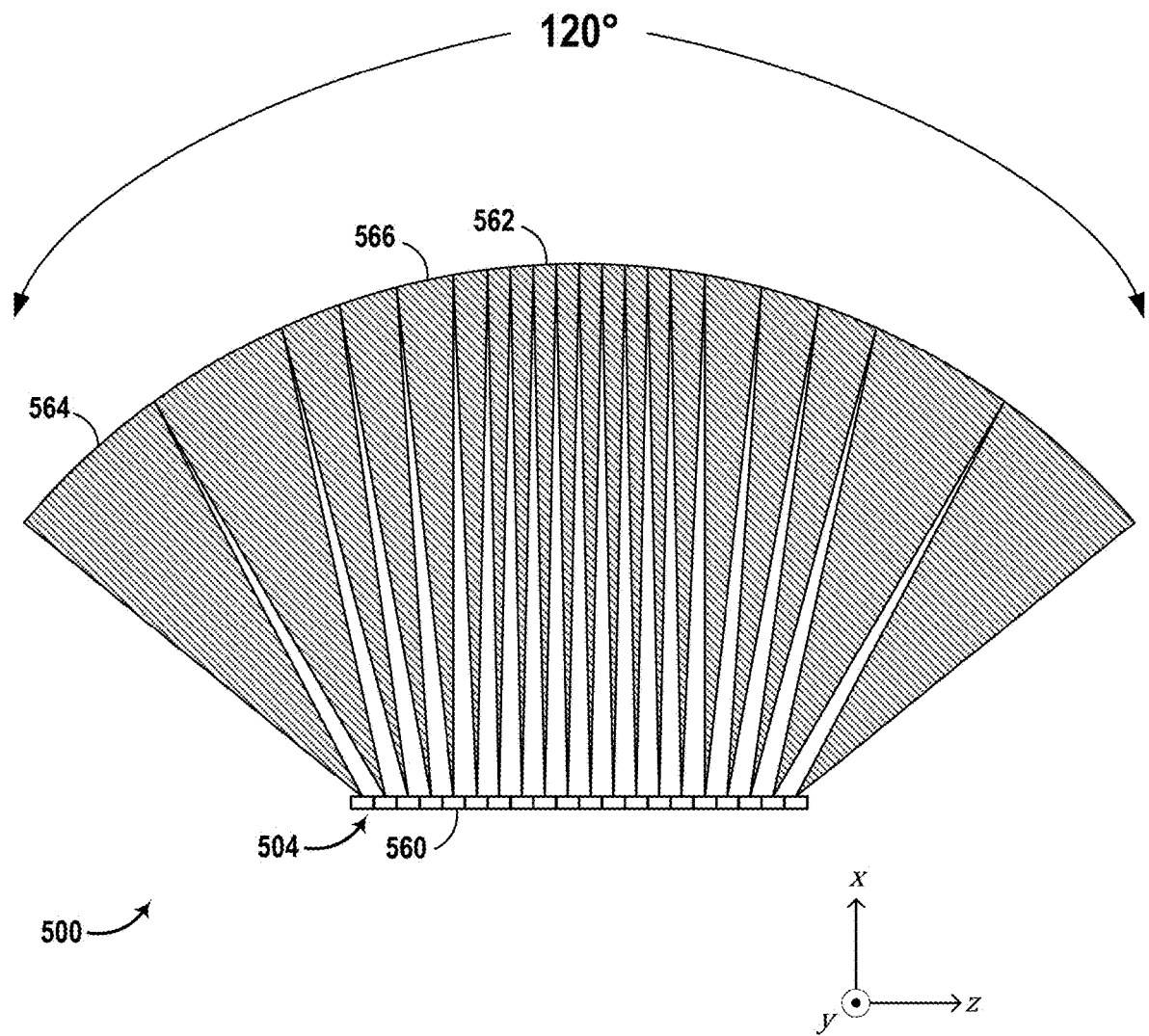
FIG. 5D is a conceptual illustration of a camera capturing an image of an environment, according to example embodiments.

FIG. 5D is a conceptual illustration of a camera (e.g., the camera 500 shown and described with reference to FIGS. 5A-5C) capturing an image of an environment (e.g., the environment 550 shown and described with reference to FIGS. 5A and 5B). For illustrative purposes (e.g., in order to avoid cluttering the drawing), the foveated lens 510 of the camera 500 is not shown. However, it is understood that the array of angular optical resolutions illustrated in FIG. 5D may reflect the influence of the foveated lens 510; the size, shape, and image sensor resolution of the image sensor 504; and the position of the image sensor 504 relative to the foveated lens 510. As shown in FIG. 5D, the entire field of view captured by the image sensor 504 based on the distortion profile of the foveated lens 510 may span 120° (e.g., in azimuth measured about the y-axis illustrated). It is understood that in other embodiments, other azimuthal angle ranges are also possible and are contemplated herein.

As illustrated in FIG. 5D (and as described above), the image sensor 504 may include an array of light-sensitive pixels 560. Such light-sensitive pixels 560 may be individual detection elements of a CMOS sensor, for example. As a result of the non-uniform distortion profile of the foveated lens 510, the angular optical resolution captured by the image sensor 504 is also non-uniform across the image sensor 504. For example, near a periphery of the image sensor 504 (e.g., edges in the z-direction illustrated in FIG. 5D) and, consequently, near an edge of the field of view captured by the image sensor 504, the angular optical resolution may be different than near a center of the image sensor 504. This is shown by the illustration in FIG. 5D. The cross-hatched wedges corresponding to each of the light-sensitive pixels 560 show the range of angles from which the corresponding light-sensitive pixel 560 detects light. This angular range is inversely proportional to the resolvability in that region of the image sensor 504. In other words, the narrower a cross-hatched wedge, the more enhanced the angular optical resolution (e.g., corresponding to a lower value measured in radians/pixel) and the greater the resolvability (e.g., making it easier to resolve separate objects in the environment 550 in a corresponding captured image).

As shown in FIG. 5D, the image sensor 504 has a first angular optical resolution 562 in a central region of the image sensor 504 (e.g., corresponding to a central region of a captured field of view), a second angular optical resolution 564 near a periphery of the image sensor 504 (e.g., corresponding to a peripheral region of a captured field of view), and an intermediate angular optical resolution 566 in a region of the image sensor 504 between the central region and the periphery (e.g., an intermediate region of the image sensor 504 corresponding to an intermediate region of a captured field of view). As illustrated, the first angular optical resolution 562 may be enhanced relative to the second angular optical resolution 564. In other words, the cross-hatched wedge corresponding to the first angular optical resolution 562 may be narrower than the cross-hatched wedge corresponding to the second angular optical resolution 564. Likewise, the radians/pixel value at the light-sensitive pixel 560 corresponding to the first angular optical resolution 562 may be smaller than the radians/pixel value at the light-sensitive pixel 560 corresponding to the second angular optical resolution 564. As also illustrated, the intermediate angular optical resolution 566 may be between the first angular optical resolution 562 and the second angular optical resolution 564.

Figure 5E:
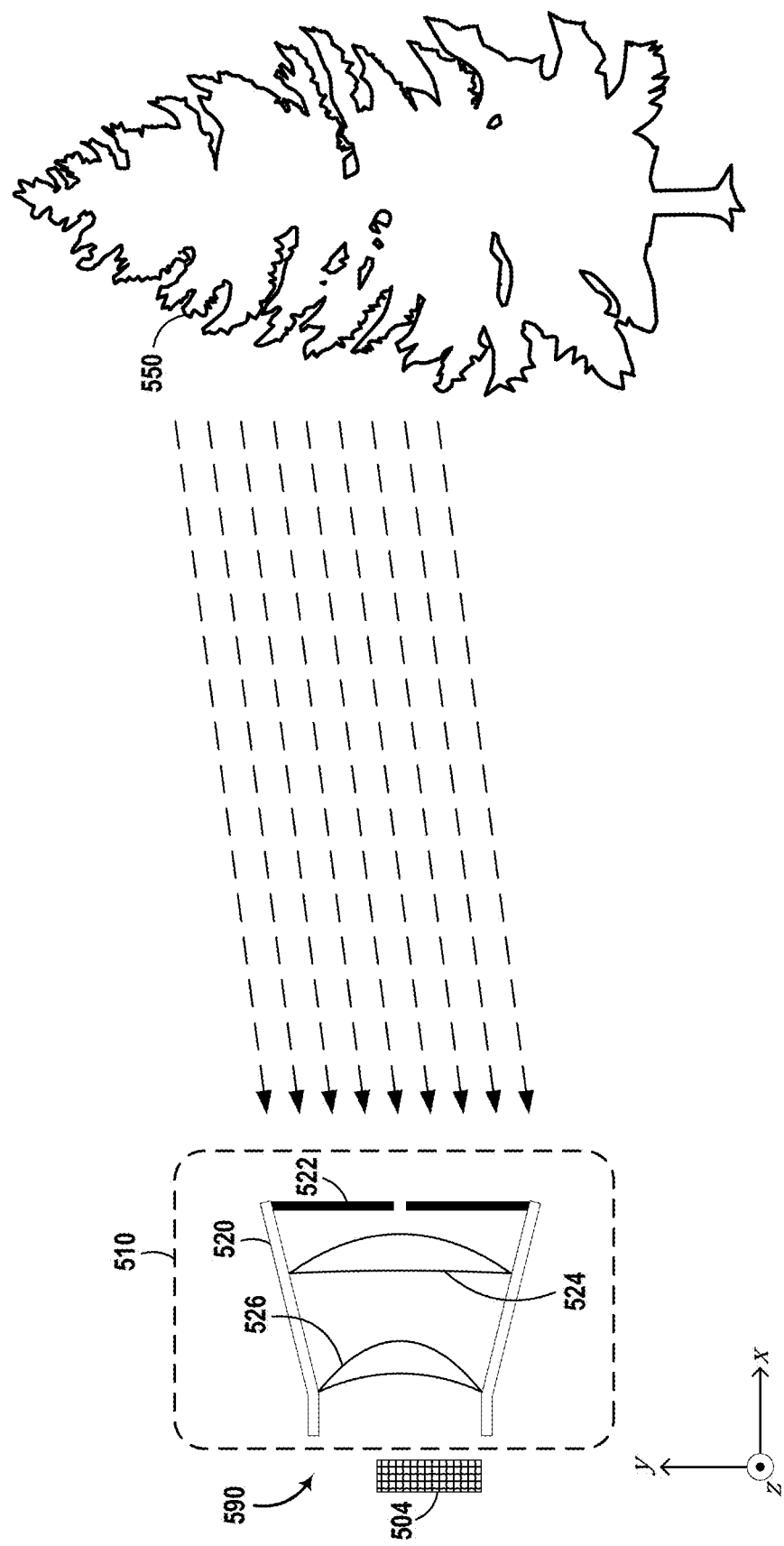
FIG. 5E is a simplified illustration of a camera capturing an image of an environment, according to example embodiments.

FIG. 5E is a simplified illustration of a camera 590 capturing an image of an environment (e.g., the environment 550 shown and described with reference to FIGS. 5A and 5B), according to example embodiments. Like the camera 500 shown and described with reference to FIGS. 5A-5D, the camera 590 of FIG. 5E includes a foveated lens 510 and an associated image sensor 504. Further, the foveated lens 510 may include a lens holder 520, an aperture stop 522, a first lens element 524, and a second lens element 526. One difference between the camera 500 shown and described with reference to FIGS. 5A-5D and the camera 590 illustrated in FIG. 5E is that the image sensor 504 in the camera 590 in FIG. 5E (e.g., a center of the image sensor 504) is vertically offset (e.g., offset along the y-direction illustrated) with respect to the foveated lens 510. In particular, the image sensor 504 may be positioned vertically off-center relative to a principal axis (e.g., central optical axis) of the foveated lens 510. By vertically offsetting the image sensor 504 relative to the foveated lens 510, an elevation extent (e.g., an angular range about the z-axis illustrated) of the field of view may also be offset (e.g., relative to the horizon). For example, the elevation extent of the field of view may be asymmetric relative to the horizon (e.g., may range from 15° below the horizon to 30° above the horizon). Such an asymmetry may allow, for example, for simultaneous image capture of both traffic signals and a road surface (e.g., when the camera 590 is mounted on a vehicle operating in an autonomous or semi-autonomous mode).

Although the image sensor 504 is vertically offset below the foveated lens 510 (e.g., at a lower y-value than the foveated lens 510), it is understood that the image sensor 504 could additionally or alternatively be offset in other ways, as well. For example, the image sensor 504 could be vertically offset above the foveated lens 510 (e.g., at a higher y-value than the foveated lens 510), horizontally offset to the left of the foveated lens 510 (e.g., at a lower z-value than the foveated lens 510), and/or horizontally offset to the right of the foveated lens 510 (e.g., at a greater z-value than the foveated lens 510).

Figure 6A:
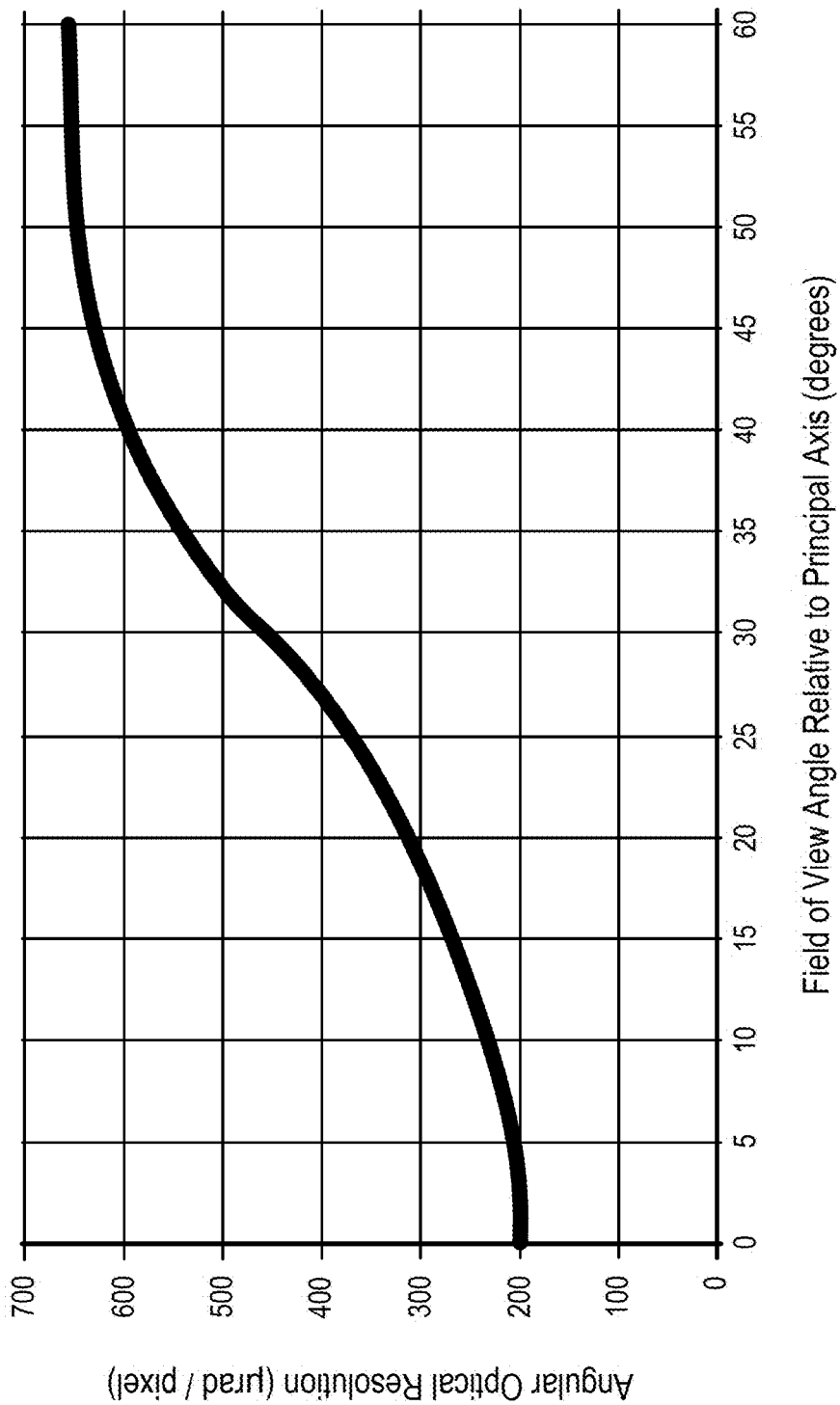
FIG. 6A is a plot of an angular optical resolution of a camera including a foveated lens, according to example embodiments.
Figure 6B:
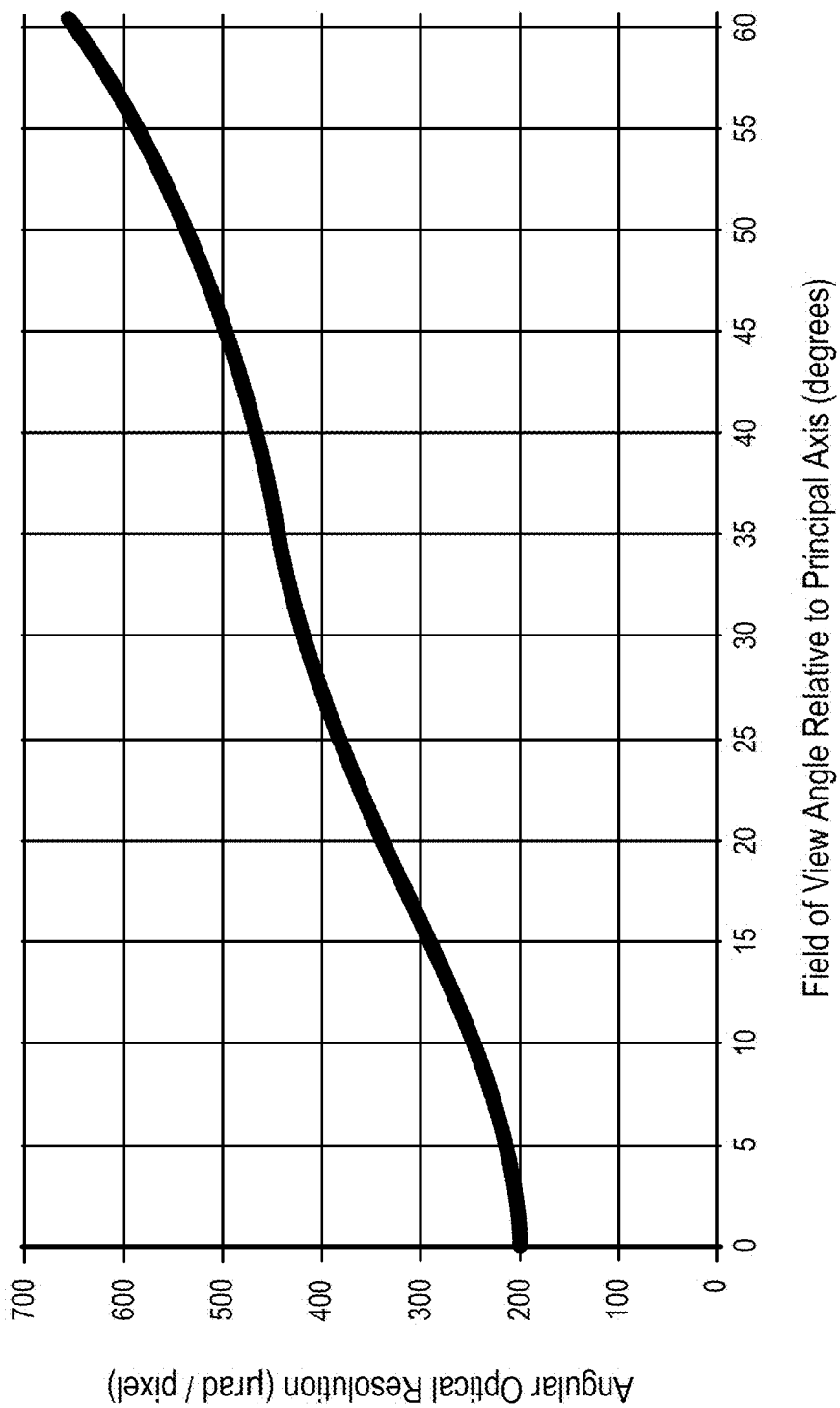
FIG. 6B is a plot of an angular optical resolution of a camera including a foveated lens, according to example embodiments.

FIGS. 6A and 6B are illustrations of angular optical resolutions of cameras (e.g., the camera 500 shown and described with reference to FIGS. 5A-5D). FIG. 6A shows one possible angular optical resolution profile (e.g., based on an arrangement of a foveated lens 510 and an image sensor 504), while FIG. 6B shows another possible angular optical resolution profile (e.g., based on a different type of foveated lens 510 or an image sensor 504 and/or a different arrangement of a foveated lens 510 and image sensor 504 than is illustrated in FIG. 6A). As illustrated in FIGS. 6A and 6B, the angular optical resolutions (e.g., measured in urad/pixel) are plotted relative to the field of view angle relative to a principal axis of the foveated lens 510 (e.g., measured in degrees). In some embodiments, the first angular optical resolution (e.g., the angular optical resolution near 0° field of view angle relative to the principal axis) may be between 100 μrad/pixel and 250 μrad/pixel and the second angular optical resolution (e.g., the angular optical resolution near 60° field of view angle relative to the principal axis) may be between 500 μrad/pixel and 1000 μrad/pixel. For example, as illustrated, the angular optical resolution may nonlinearly rise from about 200 μrad/pixel at a 0° field of view angle to about 650 μrad/pixel at a 60° field of view angle (e.g., through one or more intermediate angular optical resolutions). In embodiments where the foveated lens 510 is rotationally symmetric, the plots illustrated in FIGS. 6A and 6B may equally apply in all angular directions. In such embodiments, based on the aspect ratio of the image sensor 504, the curves of FIGS. 6A and 6B may not be fully exhibited in all directions (e.g., because one or more directions might not fully extend to 60° relative to the principal axis). For example, the elevational extent of the captured field of view may only be 45° (meaning the curves illustrated in FIGS. 6A and 6B would only be exhibited in elevation from 0° to 22.5° since the field of view is twice the maximum angle relative to the principal axis). Similarly, if the azimuthal extent of the captured field of view is 120° (e.g., because the width:height aspect ratio of the image sensor is greater than 1:1), the curves illustrated in FIGS. 6A and 6B would be exhibited in azimuth from 0° to 60°. In some embodiments (e.g., embodiments with anisotropic distortion profiles), the plots illustrated in FIGS. 6A and 6B may represent examples of many various plots that could be generated for different angular directions (e.g., a separate plot could be generated for each of φ=0°, φ=45°, φ=90°, φ=135°, φ=180°, φ=225°, φ=270°, and φ=315°.

As illustrated in FIGS. 6A and 6B, the angular optical resolutions of the foveated lens 510 may be non-uniform with respect to field of view angle. This may correspond to a captured image where the resolvability is different in different regions of the image. For example, because the angular optical resolution is greater near a center of the field of view (e.g., near 0° field of view angle), the resolvability may be greater near a central region of the captured image than around the periphery of the captured image. As a corollary, various objects in the captured image may be deformed (e.g., stretched) differently in different regions of the captured image. For example, objects near the edges of the field of view of the captured image may be stretched or elongated more than objects near the center of the field of view of the captured image (e.g., as a result of the engineered distortion profile of the foveated lens 510). In some embodiments, the distortion profile of the foveated lens 510 may transition from a first degree of distortion (e.g., in a central region of the foveated lens 510) to a second degree of distortion (e.g., in a peripheral region of the foveated lens 510) through one or more intermediate degrees of distortion (e.g., in one or more intermediate regions of the foveated lens 510). For example, the first degree of distortion may be less than the second degree of distortion and the intermediate degree(s) of distortion may be between the first degree of distortion and the second degree of distortion. For instance, an absolute value of the first degree of distortion may be less than 1%, less than 5%, or less than 10% and an absolute value of the second degree of distortion may be at least 55%, at least 60%, at least 65%, or at least 70%.

The distortion profile of the foveated lens 510 may be designed using design constraints. In some embodiments, the design constraints may include both horizontal (i.e., azimuthal) field of view design constraints and vertical (i.e., elevational) field of view design constraints. Such design constraints may include resolvability constraints for different regions of the field of view. For example, central regions of the field of view may have enhanced resolvability constraints relative to peripheral regions of the field of view. The resolvability constraints may be defined, for example, in terms of a minimum object height within a captured image (e.g., in terms of image pixels) for an environmental object of a given size when that object is located at a minimum threshold distance from the camera 500 (e.g., a human that is 1.8m tall, located in the central region of the field of view and 100 m away from the camera 500, must extend at least 10 pixels vertically).

Additionally or alternatively, in embodiments where the foveated lens 510 is rotationally symmetric, the engineered distortion profile of the foveated lens 510 may be designed to simultaneously satisfy both the horizontal field of view design constraints and the vertical field of view design constraints. For instance, a first minimum resolvability may be required at 0° relative to the principal axis in the azimuthal direction, a second minimum resolvability may be required at 15° relative to the principal axis in the elevation direction, and a third minimum resolvability may be required at 45° relative to the principal axis in the azimuthal direction. The distortion profile of the foveated lens 510 may be designed so as to simultaneously satisfy each of these design constraints.

Further, the distortion profile of the foveated lens 510 may be designed to satisfy a minimum angular field of view (e.g., both in elevation and in azimuth). For example, the distortion profile of the foveated lens 510 may be designed to result in a captured image that has at least a 90°, at least a 100°, at least a 110°, at least a 120°, at least a 130°, at least a 140°, or at least a 150° azimuthal field of view and at least a 30°, at least a 35°, at least a 40°, at least a 45°, at least a 50°, at least a 55°, or at a 60° elevational field of view. The distortion profile of the foveated lens 510 may be designed to accommodate such fields of view based, in part, on the position and size (e.g., aspect ratio, length, and/or width) of an image sensor (e.g., the image sensor 504 shown and described with reference to FIGS. 5A-5E) associated with the foveated lens 510. It is understood that other resolvability design constraints are also possible and are contemplated herein.

Figure 7:
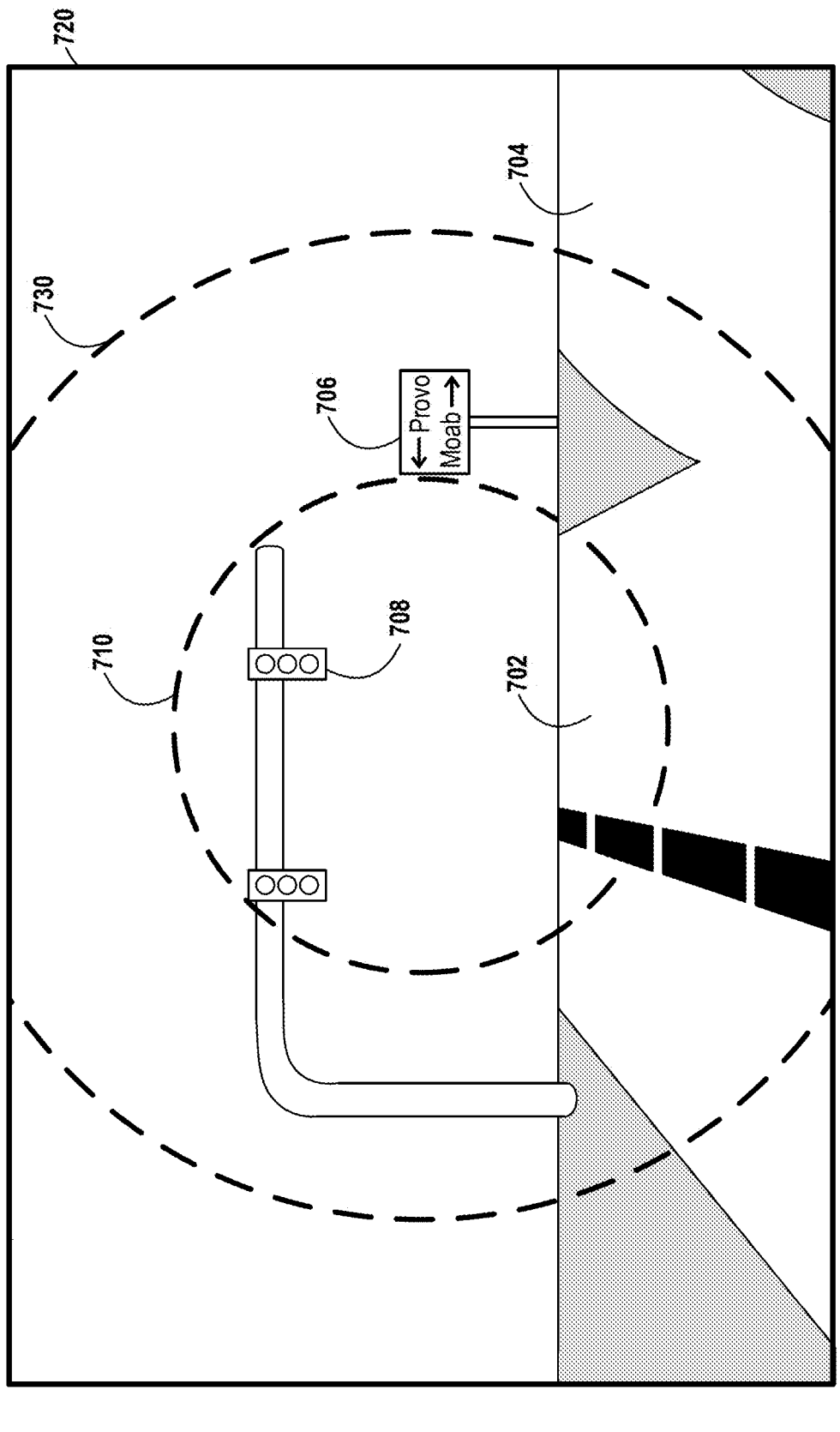
FIG. 7 is an illustration of a field of view of a camera including a foveated lens, according to example embodiments.

FIG. 7 is an illustration of a field of view of a camera (e.g., the camera 500 shown and described with reference to FIGS. 5A-5E) that includes a foveated lens (e.g., the foveated lens 510 shown and described with reference to FIGS. 5A-5E). As shown, the field of view of the camera 500 may include a roadway 702, an exit lane 704, a roadside sign 706, and traffic signals 708. Further, the field of view of the camera 500 may include a central region 710 (region inside of the inner circle), a peripheral region 720 (region outside of the outer circle), and an intermediate region 730 (region between the central region 710 and the peripheral region 720). The field of view shown in FIG. 7 may correspond to a field of view of an environment surrounding a vehicle on which the camera 500 is mounted. For example, a center region of the field of view may correspond to a forward direction or a reverse direction of a vehicle on which the camera 500 is mounted. Fields of view of other environments (e.g., environments not associated with vehicles) are also possible and are contemplated herein.

As illustrated, portions of the roadway 702 may be located in each of the central region 710, the peripheral region 720, and the intermediate region 730; portions of the exit lane 704 may be located in the peripheral region 720 and the intermediate region 730; the roadside sign 706 may be located in the intermediate region 730; and the traffic signals 708 may be located in the central region 710. Other objects may additionally or alternatively be included in the field of view. For example, objects adjacent to a road surface (e.g., street lights), lane markers, and/or other vehicles may be present in the field of view. Further, in other embodiments, objects included in the field of view of FIG. 7 may be located in other regions than shown. For example, the roadside sign 706 may be located in the central region 710 or in the peripheral region 720.

The anticipated location of various objects in the field of view illustrated in FIG. 7 and their relative importance (e.g., when it comes to detecting and/or identifying those objects based on a corresponding captured image) may be used when designing the distortion profile for the foveated lens 510. For example, other vehicles may appear within the central region 710 of the field of view. Detecting and identifying other vehicles may be of high importance, which may result in a design that has an enhanced angular optical resolution in the central region 710 and, correspondingly, a low amount of distortion in the distortion profile of the foveated lens 510 at small angle values. Similarly, objects located adjacent to the roadway (e.g., trees or bushes) may appear in the peripheral region 720 of the field of view. Detecting and identifying trees or bushes may be of lower relative importance, which may result in a design that has a reduced angular optical resolution in the peripheral region 720 and, correspondingly, a high amount of distortion in the distortion profile of the foveated lens 510 at large angle values. Angular optical resolutions that correspond to distortion profile designs that capture both of these features are illustrated in FIGS. 6A and 6B, for example.

It is understood that the field of view shown in FIG. 7 is provided solely for illustrative purposes. For example, the field of view illustrated in FIG. 7 may not accurately represent the image distortion induced by the distortion profile of the foveated lens 510. Likewise, the aspect ratio of the field of view might not represent an actual field of view (e.g., based on an arrangement of the foveated lens 510 and the image sensor 504). Hence, while the field of view illustrated may be indicative of an image captured by an image sensor 504 of the camera 500, the field of view might not precisely correspond to an actual captured image (e.g., because it is not properly distorted).

Figure 8:
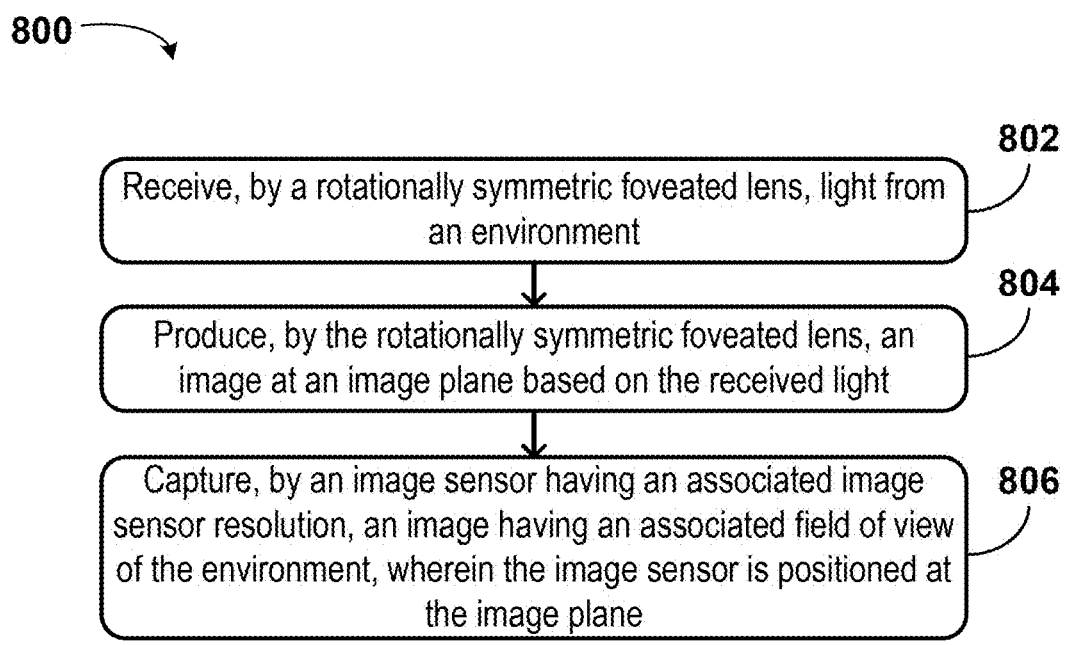
FIG. 8 is a flowchart illustration of a method, according to example embodiments.

FIG. 8 is a flowchart diagram of a method 800, according to example embodiments. In some embodiments, the method 800 may be performed using a camera (e.g., the camera 500 including the foveated lens as shown and described with reference to FIGS. 5A-5D).

At block 802, the method 800 may include receiving, by a rotationally symmetric foveated lens, light from an environment.

At block 804, the method 800 may include producing, by the rotationally symmetric foveated lens, an image at an image plane based on the received light.

At block 806, the method 800 may include capturing, by an image sensor having an associated image sensor resolution, an image having an associated field of view of the environment, wherein the image sensor is positioned at the image plane. Based on a distortion profile of the rotationally symmetric foveated lens and the image sensor resolution, the captured image may exhibit a first angular optical resolution in a central region of the field of view. Based on the distortion profile of the rotationally symmetric foveated lens and the image sensor resolution, the capture image may also exhibit a second angular optical resolution in a peripheral region of the field of view. Further, based on the distortion profile of the rotationally symmetric foveated lens and the image sensor resolution, the capture image may exhibit an intermediate angular optical resolution in an intermediate region of the field of view. The intermediate region of the field of view may be between the central region of the field of view and the peripheral region of the field of view. The first angular optical resolution may be enhanced relative to the second angular optical resolution. The intermediate angular optical resolution may be between the first angular optical resolution and the second angular optical resolution.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
  a rotationally symmetric foveated lens configured to:
    receive light from an environment; and
    produce an image at an image plane based on the received light; and
  an image sensor having an associated image sensor resolution, wherein the image sensor is positioned at the image plane and configured to capture an image having an associated field of view of the environment,
  wherein, based on a distortion profile of the rotationally symmetric foveated lens and the image sensor resolution, the captured image exhibits:
    a first angular optical resolution in a central region of the field of view;
    a second angular optical resolution in a peripheral region of the field of view; and
    an intermediate angular optical resolution in an intermediate region of the field of view, wherein the intermediate region of the field of view is between the central region of the field of view and the peripheral region of the field of view,
  wherein the first angular optical resolution is enhanced relative to the second angular optical resolution,
  wherein the intermediate angular optical resolution is between the first angular optical resolution and the second angular optical resolution, and
  wherein the distortion profile of the rotationally symmetric foveated lens transitions from a first degree of distortion to a second degree of distortion through an intermediate degree of distortion.

2. The device of claim 1, wherein the environment comprises an environment surrounding a vehicle.

3. The device of claim 2, wherein a forward direction or a reverse direction of the vehicle coincides with a central region of the field of view.

4. The device of claim 2,
  wherein the intermediate region of the field of view coincides with a location of roadside signs, objects adjacent to a road surface, traffic signals, or exit lanes, and
  wherein the central region of the field of view coincides with a location of lane markers, a road surface, or other vehicles.

5. The device of claim 1, wherein the first angular optical resolution is between 100 μrad/pixel and 250 μrad/pixel, and wherein the second angular optical resolution is between 500 μrad/pixel and 1000 μrad/pixel.

6. The device of claim 1,
  wherein the image sensor is positioned vertically off-center relative to a principal axis of the rotationally symmetric foveated lens, and
  wherein an elevation extent of the field of view is asymmetric relative to a horizon in the environment.

7. The device of claim 1,
  wherein the central region of the field of view includes objects in the environment located along a principal axis of the rotationally symmetric foveated lens,
  wherein the intermediate region of the field of view includes objects in the environment located along an axis that is at a 15° angle with respect to the principal axis of the rotationally symmetric foveated lens, and
  wherein the peripheral region of the field of view includes objects in the environment located along an axis that is at a 45° angle with respect to the principal axis of the rotationally symmetric foveated lens.

8. The device of claim 1, wherein an absolute value of the second degree of distortion is at least 60%.

9. The device of claim 1,
  wherein the foveated lens comprises a lens assembly, and
  wherein the lens assembly comprises a first aspheric lens.

10. The device of claim 9, wherein the first aspheric lens has a diameter of less than 25 mm.

11. The device of claim 9,
  wherein the lens assembly further comprises:
    an aperture stop; and
    a second aspheric lens,
  wherein the second aspheric lens and the first aspheric lens are positioned on opposite sides of the aperture stop, and
  wherein the image sensor is positioned nearer to the second aspheric lens than the first aspheric lens.

12. The device of claim 9,
  wherein the lens assembly further comprises a spherical lens, and
  wherein the spherical lens is positioned between the first aspheric lens and the environment.

13. The device of claim 1, wherein the foveated lens comprises components fabricated from molded optical glass.

14. The device of claim 1, wherein the foveated lens is fabricated from molded optical plastic.

15. The device of claim 1,
  wherein the foveated lens comprises a lens holder, and
  wherein the lens holder is fabricated to provide thermal stability.

16. The device of claim 15, wherein the lens holder is fabricated from aluminum.

17. The device of claim 1, wherein the field of view captures an azimuthal portion of the environment that spans at least 120° and an elevation portion of the environment that spans at least 45°.

18. The device of claim 1,
  wherein the image sensor has an aspect ratio of at least 2:1 (width:height),
  wherein the image sensor resolution is at least 17 MP, and
  wherein each light-sensitive pixel in the image sensor has an areal size of less than 6.25 μm².

19. A method comprising:
  receiving, by a rotationally symmetric foveated lens, light from an environment;
  producing, by the rotationally symmetric foveated lens, an image at an image plane based on the received light;
  capturing, by an image sensor having an associated image sensor resolution, an image having an associated field of view of the environment, wherein the image sensor is positioned at the image plane, wherein, based on a distortion profile of the rotationally symmetric foveated lens and the image sensor resolution, the captured image exhibits:
- a first angular optical resolution in a central region of the field of view;
- a second angular optical resolution in a peripheral region of the field of view; and
- an intermediate angular optical resolution in an intermediate region of the field of view, wherein the intermediate region of the field of view is between the central region of the field of view and the peripheral region of the field of view, wherein the first angular optical resolution is enhanced relative to the second angular optical resolution, wherein the intermediate angular optical resolution is between the first angular optical resolution and the second angular optical resolution, and wherein the distortion profile of the rotationally symmetric foveated lens transitions from a first degree of distortion to a second degree of distortion through an intermediate degree of distortion.

20. A vehicle comprising:
a camera, wherein the camera comprises:
- a rotationally symmetric foveated lens configured to:
  - receive light from an environment; and
  - produce an image at an image plane based on the received light; and
- an image sensor having an associated image sensor resolution, wherein the image sensor is positioned at the image plane and configured to capture an image having an associated field of view of the environment, wherein, based on a distortion profile of the rotationally symmetric foveated lens and the image sensor resolution, the captured image exhibits:
- a first angular optical resolution in a central region of the field of view;
- a second angular optical resolution in a peripheral region of the field of view; and
- an intermediate angular optical resolution in an intermediate region of the field of view, wherein the intermediate region of the field of view is between the central region of the field of view and the peripheral region of the field of view, wherein the first angular optical resolution is enhanced relative to the second angular optical resolution, wherein the intermediate angular optical resolution is between the first angular optical resolution and the second angular optical resolution, and wherein the distortion profile of the rotationally symmetric foveated lens transitions from a first degree of distortion to a second degree of distortion through an intermediate degree of distortion.

* * * * *